US011712142B2

(12) United States Patent
Haegermarck

(10) Patent No.: US 11,712,142 B2
(45) Date of Patent: *Aug. 1, 2023

(54) SYSTEM OF ROBOTIC CLEANING DEVICES

(71) Applicant: Aktiebolaget Electrolux, Stockholm (SE)

(72) Inventor: Anders Haegermarck, Trångsund (SE)

(73) Assignee: Aktiebolaget Electrolux

( * ) Notice: Subject to any disclaimer, the term of this patent is extended or adjusted under 35 U.S.C. 154(b) by 344 days.

This patent is subject to a terminal disclaimer.

(21) Appl. No.: 17/089,097

(22) Filed: Nov. 4, 2020

(65) Prior Publication Data

US 2021/0106196 A1    Apr. 15, 2021

Related U.S. Application Data

(62) Division of application No. 15/755,890, filed as application No. PCT/EP2015/070140 on Sep. 3, 2015, now Pat. No. 10,874,274.

(51) Int. Cl.
*A47L 9/28* (2006.01)
*A47L 11/24* (2006.01)
(Continued)

(52) U.S. Cl.
CPC ............ *A47L 9/2852* (2013.01); *A47L 9/2894* (2013.01); *A47L 11/24* (2013.01); *A47L 11/28* (2013.01);
(Continued)

(58) Field of Classification Search
CPC .................................................. A47L 2201/04
See application file for complete search history.

(56) References Cited

U.S. PATENT DOCUMENTS 1,286,321 A    12/1918   Hoover
1,401,007 A    12/1921   Staples
(Continued)

FOREIGN PATENT DOCUMENTS

CA    2154758    6/1995
CN    1116818    2/1996
(Continued)

OTHER PUBLICATIONS

Korean Office Action for Korean Application No. 10-2018-7007116, dated Dec. 6, 2021 with translation, 13 pages.
(Continued)

*Primary Examiner* — Andrew A Horton
(74) *Attorney, Agent, or Firm* — RatnerPrestia

(57) ABSTRACT

A system of robotic cleaning devices and a method of a master robotic cleaning device of controlling at least one slave robotic cleaning device. The method performed by a master robotic cleaning device of controlling at least one slave robotic cleaning device includes detecting obstacles, deriving positional data from the detection of obstacles, positioning the master robotic cleaning device with respect to the detected obstacles from the derived positional data, controlling movement of the master robotic cleaning device based on the positional data, and submitting commands to the at least one slave robotic cleaning device to control a cleaning operation of said at least one slave robotic cleaning device, the commands being based on the derived positional data, wherein the cleaning operation of the slave robotic cleaning device is controlled as indicated by the submitted commands.

14 Claims, 9 Drawing Sheets

(51) Int. Cl.
*A47L 11/28* (2006.01)
*G05D 1/00* (2006.01)
*G05D 1/02* (2020.01)

(52) U.S. Cl.
CPC ........... *G05D 1/0022* (2013.01); *G05D 1/024* (2013.01); *G05D 1/0225* (2013.01); *A47L 2201/00* (2013.01); *A47L 2201/02* (2013.01); *A47L 2201/04* (2013.01); *Y10S 901/01* (2013.01)

(56) References Cited

U.S. PATENT DOCUMENTS

| | | |
|---|---|---|
| 3,010,129 A | 11/1961 | Moore |
| 3,233,274 A | 2/1966 | Kroll |
| 3,550,714 A | 12/1970 | Bellinger |
| 3,570,227 A | 3/1971 | Bellinger |
| 3,713,505 A | 1/1973 | Muller |
| 3,837,028 A | 9/1974 | Bridge |
| 4,028,765 A | 6/1977 | Liebscher |
| 4,036,147 A | 7/1977 | Westling |
| 4,114,711 A | 9/1978 | Wilkins |
| 4,119,900 A | 10/1978 | Kremnitz |
| 4,306,174 A | 12/1981 | Mourier |
| 4,306,329 A | 12/1981 | Yokoi |
| 4,369,543 A | 1/1983 | Chen |
| 4,502,173 A | 3/1985 | Patzold |
| 4,627,511 A | 12/1986 | Yajima |
| 4,647,209 A | 3/1987 | Neukomm |
| 4,800,978 A | 1/1989 | Wasa |
| 4,822,450 A | 4/1989 | Davis |
| 4,825,091 A | 4/1989 | Breyer |
| 4,836,905 A | 6/1989 | Davis |
| 4,838,990 A | 6/1989 | Jucha |
| 4,842,686 A | 6/1989 | Davis |
| 4,849,067 A | 7/1989 | Jucha |
| 4,854,000 A | 8/1989 | Takimoto |
| 4,864,511 A | 9/1989 | Moy |
| 4,872,938 A | 10/1989 | Davis |
| 4,878,003 A | 10/1989 | Knepper |
| 4,886,570 A | 12/1989 | Davis |
| 4,918,607 A | 4/1990 | Wible |
| 4,919,224 A | 4/1990 | Shyu |
| 4,922,559 A | 5/1990 | Wall |
| 4,959,192 A | 9/1990 | Trundle |
| 4,962,453 A | 10/1990 | Pong |
| 4,989,818 A | 2/1991 | Trundle |
| 5,001,635 A | 3/1991 | Yasutomi |
| 5,006,302 A | 4/1991 | Trundle |
| 5,023,444 A | 6/1991 | Ohman |
| 5,032,775 A | 7/1991 | Mizuno |
| 5,034,673 A | 7/1991 | Shoji |
| 5,042,861 A | 8/1991 | Trundle |
| 5,045,118 A | 9/1991 | Mason |
| 5,086,535 A | 2/1992 | Grossmeyer |
| 5,095,577 A | 3/1992 | Jonas |
| 5,107,946 A | 4/1992 | Kamimura |
| 5,155,683 A | 10/1992 | Rahim |
| 5,243,732 A | 9/1993 | Koharagi |
| 5,245,177 A | 9/1993 | Schiller |
| 5,276,933 A | 1/1994 | Hennessey |
| 5,279,672 A | 1/1994 | Betker |
| 5,293,955 A | 3/1994 | Lee |
| 5,307,273 A | 4/1994 | Oh |
| 5,309,592 A | 5/1994 | Hiratsuka |
| 5,341,540 A | 8/1994 | Soupert |
| 5,345,639 A | 9/1994 | Tanoue |
| 5,349,378 A | 9/1994 | Maali |
| 5,353,224 A | 10/1994 | Lee |
| 5,367,458 A | 11/1994 | Roberts |
| 5,369,347 A | 11/1994 | Yoo |
| 5,377,106 A | 12/1994 | Drunk |
| 5,390,627 A | 2/1995 | van der Berg |
| 5,398,632 A | 3/1995 | Goldbach |
| 5,402,051 A | 3/1995 | Fujiwara |
| 5,440,216 A | 8/1995 | Kim |
| 5,444,965 A | 8/1995 | Colens |
| 5,446,356 A | 8/1995 | Kim |
| 5,454,129 A | 10/1995 | Kell |
| 5,464,494 A | 11/1995 | Gerd |
| 5,646,494 A | 7/1997 | Han |
| 5,666,689 A | 9/1997 | Andersen |
| 5,682,313 A | 10/1997 | Edlund |
| 5,682,640 A | 11/1997 | Han |
| 5,687,294 A | 11/1997 | Jeong |
| 5,698,957 A | 12/1997 | Sowada |
| 5,745,946 A | 5/1998 | Thrasher |
| 5,758,298 A | 5/1998 | Guldner |
| 5,778,554 A | 7/1998 | Jones |
| 5,781,960 A | 7/1998 | Kilstrom |
| 5,787,545 A | 8/1998 | Colens |
| 5,815,880 A | 10/1998 | Nakanishi |
| 5,825,981 A | 10/1998 | Matsuda |
| 5,841,259 A | 11/1998 | Kim |
| 5,852,984 A | 12/1998 | Matsuyama |
| 5,867,800 A | 2/1999 | Leif |
| 5,890,250 A | 4/1999 | Lange |
| 5,896,488 A | 4/1999 | Jeong |
| 5,903,124 A | 5/1999 | Kawakami |
| 5,926,909 A | 7/1999 | McGee |
| 5,933,902 A | 8/1999 | Frey |
| 5,935,179 A | 8/1999 | Kleiner |
| 5,940,927 A | 8/1999 | Haegermarck |
| 5,942,869 A | 8/1999 | Katou |
| 5,947,051 A | 9/1999 | Geiger |
| 5,959,423 A | 9/1999 | Nakanishi |
| 5,959,424 A | 9/1999 | Elkmann |
| 5,966,765 A | 10/1999 | Hamada |
| RE36,391 E | 11/1999 | vandenBerg |
| 5,983,833 A | 11/1999 | van der Lely |
| 5,987,696 A | 11/1999 | Wang |
| 5,991,951 A | 11/1999 | Kubo |
| 5,995,884 A | 11/1999 | Allen |
| 5,997,670 A | 12/1999 | Walter |
| 5,999,865 A | 12/1999 | Bloomquist |
| 6,012,470 A | 1/2000 | Jones |
| 6,024,107 A | 2/2000 | Jones |
| 6,064,926 A | 5/2000 | Sarangapani |
| 6,076,662 A | 6/2000 | Bahten |
| 6,082,377 A | 7/2000 | Frey |
| 6,124,694 A | 9/2000 | Bancroft |
| 6,142,252 A | 11/2000 | Kinto |
| 6,176,067 B1 | 1/2001 | Bahten |
| 6,213,136 B1 | 4/2001 | Jones |
| 6,226,830 B1 | 5/2001 | Hendriks |
| 6,230,360 B1 | 5/2001 | Singleton |
| 6,251,551 B1 | 6/2001 | Kunze-Concewitz |
| 6,255,793 B1 | 7/2001 | Peiess |
| 6,263,989 B1 | 7/2001 | Won |
| 6,300,737 B1 | 10/2001 | Bergvall |
| 6,311,366 B1 | 11/2001 | Sepke |
| 6,327,741 B1 | 12/2001 | Reed |
| 6,339,735 B1 | 1/2002 | Peless |
| 6,358,325 B1 | 3/2002 | Andreas |
| 6,360,801 B1 | 3/2002 | Walter |
| 6,370,452 B1 | 4/2002 | Pfister |
| 6,370,453 B2 | 4/2002 | Sommer |
| 6,381,801 B1 | 5/2002 | Clemons, Sr. |
| 6,389,329 B1 | 5/2002 | Colens |
| 6,413,149 B1 | 7/2002 | Wada |
| 6,417,641 B2 | 7/2002 | Peless |
| 6,431,296 B1 | 8/2002 | Won |
| 6,443,509 B1 | 9/2002 | Levin |
| 6,457,199 B1 | 10/2002 | Frost |
| 6,457,206 B1 | 10/2002 | Judson |
| 6,459,955 B1 | 10/2002 | Bartsch |
| 6,465,982 B1 | 10/2002 | Bergvall |
| 6,481,515 B1 | 11/2002 | Kirkpatrick |
| 6,482,678 B1 | 11/2002 | Frost |
| 6,493,612 B1 | 12/2002 | Bisset |
| 6,493,613 B2 | 12/2002 | Peless |
| 6,496,754 B2 | 12/2002 | Song |
| 6,504,610 B1 | 1/2003 | Bauer |
| 6,519,804 B1 | 2/2003 | Vujik |

(56) References Cited

U.S. PATENT DOCUMENTS

| | | |
|---|---|---|
| 6,525,509 B1 | 2/2003 | Petersson |
| D471,243 S | 3/2003 | Cioffi |
| 6,532,404 B2 | 3/2003 | Coiens |
| 6,535,793 B2 | 3/2003 | Allard |
| 6,571,415 B2 | 6/2003 | Gerber |
| 6,580,246 B2 | 6/2003 | Jacobs |
| 6,581,239 B1 | 6/2003 | Dyson |
| 6,594,844 B2 | 7/2003 | Jones |
| 6,597,143 B2 | 7/2003 | Song |
| 6,601,265 B1 | 8/2003 | Burlington |
| 6,605,156 B1 | 8/2003 | Clark |
| 6,609,962 B1 | 8/2003 | Wakabayashi |
| 6,611,120 B2 | 8/2003 | Song |
| 6,611,318 B2 | 8/2003 | LaPolice |
| 6,615,108 B1 | 9/2003 | Peless |
| 6,615,885 B1 | 9/2003 | Ohm |
| 6,633,150 B1 | 10/2003 | Wallach |
| 6,637,446 B2 | 10/2003 | Frost |
| 6,658,325 B2 | 12/2003 | Zweig |
| 6,661,239 B1 | 12/2003 | Ozick |
| 6,662,889 B2 | 12/2003 | De Fazio |
| 6,667,592 B2 | 12/2003 | Jacobs |
| 6,668,951 B2 | 12/2003 | Won |
| 6,671,592 B1 | 12/2003 | Bisset |
| 6,690,134 B1 | 2/2004 | Jones |
| 6,726,823 B1 | 4/2004 | Wang |
| 6,732,826 B2 | 5/2004 | Song |
| 6,745,431 B2 | 6/2004 | Dijksman |
| 6,748,297 B2 | 6/2004 | Song |
| 6,769,004 B2 | 7/2004 | Barrett |
| 6,774,596 B1 | 8/2004 | Bisset |
| 6,775,871 B1 | 8/2004 | Finch |
| 6,781,338 B2 | 8/2004 | Jones |
| 6,809,490 B2 | 10/2004 | Jones |
| 6,810,305 B2 | 10/2004 | Kirkpatrick, Jr. |
| 6,820,801 B2 | 11/2004 | Kaneko |
| 6,841,963 B2 | 1/2005 | Song |
| 6,845,297 B2 | 1/2005 | Allard |
| 6,850,024 B2 | 2/2005 | Peless |
| 6,859,010 B2 | 2/2005 | Jeon |
| 6,859,976 B2 | 3/2005 | Plankenhorn |
| 6,860,206 B1 | 3/2005 | Rudakevych |
| 6,868,307 B2 | 3/2005 | Song |
| 6,869,633 B2 | 3/2005 | Sus |
| 6,870,792 B2 | 3/2005 | Chiappetta |
| 6,882,334 B1 | 4/2005 | Meyer |
| 6,883,201 B2 | 4/2005 | Jones |
| 6,885,912 B2 | 4/2005 | Peless |
| 6,901,624 B2 | 6/2005 | Mori |
| 6,925,679 B2 | 8/2005 | Wallach |
| D510,066 S | 9/2005 | Hickey |
| 6,938,298 B2 | 9/2005 | Aasen |
| 6,939,208 B2 | 9/2005 | Kamimura |
| 6,940,291 B1 | 9/2005 | Ozick |
| 6,941,199 B1 | 9/2005 | Bottomley |
| 6,942,548 B2 | 9/2005 | Wada |
| 6,956,348 B2 | 10/2005 | Landry |
| 6,957,712 B2 | 10/2005 | Song |
| 6,964,312 B2 | 11/2005 | Maggio |
| 6,965,209 B2 | 11/2005 | Jones |
| 6,967,275 B2 | 11/2005 | Ozick |
| 6,971,140 B2 | 12/2005 | Kim |
| 6,971,141 B1 | 12/2005 | Tak |
| 6,984,952 B2 | 1/2006 | Peless |
| 7,000,623 B2 | 2/2006 | Welsh |
| 7,004,269 B2 | 2/2006 | Song |
| 7,013,200 B2 | 3/2006 | Wakui |
| 7,013,527 B2 | 3/2006 | Thomas, Sr. |
| 7,015,831 B2 | 3/2006 | Karlsson |
| 7,024,278 B2 | 4/2006 | Chiappetta |
| 7,031,805 B2 | 4/2006 | Lee |
| 7,040,968 B2 | 5/2006 | Kamimura |
| 7,042,342 B2 | 5/2006 | Luo |
| 7,043,794 B2 | 5/2006 | Conner |
| 7,050,926 B2 | 5/2006 | Theurer |
| 7,053,578 B2 | 5/2006 | Diehl |
| 7,053,580 B2 | 5/2006 | Aldred |
| 7,054,716 B2 | 5/2006 | McKee |
| 7,059,012 B2 | 6/2006 | Song |
| 7,079,923 B2 | 7/2006 | Abramson |
| 7,082,350 B2 | 7/2006 | Skoog |
| D526,753 S | 8/2006 | Tani |
| 7,085,624 B2 | 8/2006 | Aldred |
| 7,103,449 B2 | 9/2006 | Woo |
| 7,113,847 B2 | 9/2006 | Chmura |
| 7,117,067 B2 | 10/2006 | McLurkin |
| 7,133,745 B2 | 11/2006 | Wang |
| 7,134,164 B2 | 11/2006 | Alton |
| 7,135,992 B2 | 11/2006 | Karlsson |
| 7,143,696 B2 | 12/2006 | Rudakevych |
| 7,145,478 B2 | 12/2006 | Goncalves |
| 7,150,068 B1 | 12/2006 | Ragner |
| 7,155,308 B2 | 12/2006 | Jones |
| 7,155,309 B2 | 12/2006 | Peless |
| 7,162,338 B2 | 1/2007 | Goncalves |
| 7,167,775 B2 | 1/2007 | Abramson |
| 7,173,391 B2 | 2/2007 | Jones |
| 7,174,238 B1 | 2/2007 | Zweig |
| 7,177,737 B2 | 2/2007 | Karlsson |
| 7,184,586 B2 | 2/2007 | Jeon |
| 7,185,396 B2 | 3/2007 | Im |
| 7,185,397 B2 | 3/2007 | Stuchlik |
| 7,188,000 B2 | 3/2007 | Chiappetta |
| 7,196,487 B2 | 3/2007 | Jones |
| 7,199,711 B2 | 4/2007 | Field |
| 7,200,892 B2 | 4/2007 | Kim |
| 7,202,630 B2 | 4/2007 | Dan |
| 7,206,677 B2 | 4/2007 | Huiden |
| 7,207,081 B2 | 4/2007 | Gerber |
| 7,208,892 B2 | 4/2007 | Iondra |
| 7,213,298 B2 | 5/2007 | Cipolla |
| 7,213,663 B2 | 5/2007 | Kim |
| 7,222,390 B2 | 5/2007 | Cipolla |
| 7,225,500 B2 | 6/2007 | Diehl |
| 7,237,298 B2 | 7/2007 | Reindle |
| 7,240,396 B2 | 7/2007 | Thomas, Sr. |
| 7,246,405 B2 | 7/2007 | Yan |
| 7,248,951 B2 | 7/2007 | Huiden |
| 7,251,853 B2 | 8/2007 | Park |
| 7,254,464 B1 | 8/2007 | McLurkin |
| 7,254,859 B2 | 8/2007 | Gerber |
| 7,269,877 B2 | 9/2007 | Tondra |
| 7,272,467 B2 | 9/2007 | Goncalves |
| 7,272,868 B2 | 9/2007 | Irn |
| 7,274,167 B2 | 9/2007 | Kim |
| 7,275,280 B2 | 10/2007 | Haegermarck |
| 7,288,912 B2 | 10/2007 | Landry |
| D556,961 S | 12/2007 | Swyst |
| 7,303,776 B2 | 12/2007 | Sus |
| 7,324,870 B2 | 1/2008 | Lee |
| 7,331,436 B1 | 2/2008 | Pack |
| 7,332,890 B2 | 2/2008 | Cohen |
| 7,343,221 B2 | 3/2008 | Ann |
| 7,343,719 B2 | 3/2008 | Sus |
| 7,346,428 B1 | 3/2008 | Huffman |
| 7,349,759 B2 | 3/2008 | Peless |
| 7,359,766 B2 | 4/2008 | Jeon |
| 7,363,994 B1 | 4/2008 | DeFazio |
| 7,369,460 B2 | 5/2008 | Chiappetta |
| 7,372,004 B2 | 5/2008 | Buchner |
| 7,388,343 B2 | 6/2008 | Jones |
| 7,389,156 B2 | 6/2008 | Ziegler |
| 7,389,166 B2 | 6/2008 | Harwig |
| 7,412,748 B2 | 6/2008 | Lee |
| 7,403,360 B2 | 7/2008 | Cunningham |
| 7,417,404 B2 | 8/2008 | Lee |
| 7,418,762 B2 | 9/2008 | Arai |
| 7,424,766 B2 | 9/2008 | Reindle |
| 7,429,843 B2 | 9/2008 | Jones |
| 7,430,455 B2 | 9/2008 | Casey |
| 7,438,766 B2 | 10/2008 | Song |
| 7,441,298 B2 | 10/2008 | Svendsen |
| 7,444,206 B2 | 10/2008 | Abramson |
| 7,448,113 B2 | 11/2008 | Jones |

(56) References Cited

U.S. PATENT DOCUMENTS

| | | |
|---|---|---|
| 7,459,871 B2 | 12/2008 | Landry |
| 7,464,157 B2 | 12/2008 | Okude |
| 7,474,941 B2 | 1/2009 | Kim |
| 7,480,958 B2 | 1/2009 | Song |
| 7,480,960 B2 | 1/2009 | Kim |
| D586,959 S | 2/2009 | Joseph |
| 7,489,277 B2 | 2/2009 | Sung |
| 7,489,985 B2 | 2/2009 | Ko |
| 7,499,774 B2 | 3/2009 | Barrett |
| 7,499,775 B2 | 3/2009 | Filippov |
| 7,499,776 B2 | 3/2009 | Allard |
| 7,499,804 B2 | 3/2009 | Svendsen |
| 7,503,096 B2 | 3/2009 | Lin |
| 7,515,991 B2 | 4/2009 | Egawa |
| D593,265 S | 5/2009 | Carr |
| 7,539,557 B2 | 5/2009 | Yamauchi |
| 7,546,891 B2 | 6/2009 | Won |
| 7,546,912 B1 | 6/2009 | Pack |
| 7,555,363 B2 | 6/2009 | Augenbraun |
| 7,556,108 B2 | 7/2009 | Won |
| 7,559,269 B2 | 7/2009 | Rudakevych |
| 7,564,571 B2 | 7/2009 | Karabassi |
| 7,566,839 B2 | 7/2009 | Hukuba |
| 7,567,052 B2 | 7/2009 | Jones |
| 7,568,259 B2 | 8/2009 | Yan |
| 7,568,536 B2 | 8/2009 | Yu |
| 7,571,511 B2 | 8/2009 | Jones |
| 7,573,403 B2 | 8/2009 | Goncalves |
| 7,574,282 B2 | 8/2009 | Petersson |
| 7,578,020 B2 | 8/2009 | Jaworski |
| 7,579,803 B2 | 8/2009 | Jones |
| 7,581,282 B2 | 9/2009 | Woo |
| 7,597,162 B2 | 10/2009 | Won |
| 7,600,521 B2 | 10/2009 | Woo |
| 7,600,593 B2 | 10/2009 | Filippov |
| 7,603,744 B2 | 10/2009 | Reindle |
| 7,604,675 B2 | 10/2009 | Makarov |
| 7,610,651 B2 | 11/2009 | Baek |
| 7,613,543 B2 | 11/2009 | Petersson |
| 7,620,476 B2 | 11/2009 | Morse |
| 7,636,982 B2 | 12/2009 | Jones |
| 7,647,144 B2 | 1/2010 | Haegermarck |
| 7,650,666 B2 | 1/2010 | Jang |
| 7,654,348 B2 | 2/2010 | Ohm |
| 7,660,650 B2 | 2/2010 | Kawagoe |
| 7,663,333 B2 | 2/2010 | Jones |
| 7,673,367 B2 | 3/2010 | Kim |
| 7,679,532 B2 | 3/2010 | Karlsson |
| 7,688,676 B2 | 3/2010 | Chiappetta |
| 7,693,654 B1 | 4/2010 | Dietsch |
| 7,697,141 B2 | 4/2010 | Jones |
| 7,706,917 B1 | 4/2010 | Chiappetta |
| 7,706,921 B2 | 4/2010 | Jung |
| 7,709,497 B2 | 5/2010 | Christensen, IV |
| 7,711,450 B2 | 5/2010 | Im |
| 7,720,572 B2 | 5/2010 | Ziegler |
| 7,721,829 B2 | 5/2010 | Lee |
| 7,729,801 B2 | 6/2010 | Abramson |
| 7,749,294 B2 | 7/2010 | Oh |
| 7,751,940 B2 | 7/2010 | Lee |
| 7,761,954 B2 | 7/2010 | Ziegler |
| 7,765,635 B2 | 8/2010 | Park |
| 7,765,638 B2 | 8/2010 | Pineschi |
| 7,769,490 B2 | 8/2010 | Abramson |
| 7,774,158 B2 | 8/2010 | Domingues Goncalves |
| 7,779,504 B2 | 8/2010 | Lee |
| 7,780,796 B2 | 8/2010 | Shim |
| 7,784,139 B2 | 8/2010 | Sawalski |
| 7,784,570 B2 | 8/2010 | Couture |
| 7,785,544 B2 | 8/2010 | Alward |
| 7,787,991 B2 | 8/2010 | Jeung |
| 7,793,614 B2 | 9/2010 | Ericsson |
| 7,801,645 B2 | 9/2010 | Taylor |
| 7,805,220 B2 | 9/2010 | Taylor |
| 7,827,653 B1 | 11/2010 | Liu |
| 7,832,048 B2 | 11/2010 | Harwig |
| 7,835,529 B2 | 11/2010 | Hernandez |
| 7,843,431 B2 | 11/2010 | Robbins |
| 7,844,364 B2 | 11/2010 | McLurkin |
| 7,849,555 B2 | 12/2010 | Hahm |
| 7,856,291 B2 | 12/2010 | Jung |
| 7,860,608 B2 | 12/2010 | Lee |
| 7,861,365 B2 | 1/2011 | Sun |
| 7,861,366 B2 | 1/2011 | Hahm |
| 7,873,437 B2 | 1/2011 | Aldred |
| 7,877,166 B2 | 1/2011 | Harwig |
| 7,886,399 B2 | 2/2011 | Dayton |
| 7,890,210 B2 | 2/2011 | Choi |
| 7,891,045 B2 | 2/2011 | Kim |
| 7,891,289 B2 | 2/2011 | Day |
| 7,891,446 B2 | 2/2011 | Couture |
| 7,894,951 B2 | 2/2011 | Norris |
| 7,916,931 B2 | 3/2011 | Lee |
| 7,920,941 B2 | 4/2011 | Park |
| 7,921,506 B2 | 4/2011 | Baek |
| 7,926,598 B2 | 4/2011 | Rudakevych |
| 7,934,571 B2 | 5/2011 | Chiu |
| 7,937,800 B2 | 5/2011 | Yan |
| 7,942,107 B2 | 5/2011 | Vosburgh |
| 7,957,837 B2 | 6/2011 | Ziegler |
| 7,962,997 B2 | 6/2011 | Chung |
| 7,966,339 B2 | 6/2011 | Kim |
| 7,975,790 B2 | 7/2011 | Kim |
| 7,979,175 B2 | 7/2011 | Allard |
| 7,979,945 B2 | 7/2011 | Dayton |
| 7,981,455 B2 | 7/2011 | Sus |
| 7,997,118 B2 | 8/2011 | Mecca |
| 8,001,651 B2 | 8/2011 | Chang |
| 8,007,221 B1 | 8/2011 | More |
| 8,010,229 B2 | 8/2011 | Kim |
| 8,019,223 B2 | 9/2011 | Hudson |
| 8,020,657 B2 | 9/2011 | Allard |
| 8,032,978 B2 | 10/2011 | Haegermarck |
| 8,034,390 B2 | 10/2011 | Sus |
| 8,042,663 B1 | 10/2011 | Pack |
| 8,046,103 B2 | 10/2011 | Abramson |
| 8,061,461 B2 | 11/2011 | Couture |
| 8,065,778 B2 | 11/2011 | Kim |
| 8,073,439 B2 | 12/2011 | Stromberg |
| 8,074,752 B2 | 12/2011 | Rudakevych |
| 8,078,338 B2 | 12/2011 | Pack |
| 8,079,432 B2 | 12/2011 | Ohm |
| 8,082,836 B2 | 12/2011 | More |
| 8,086,419 B2 | 12/2011 | Goncalves |
| 8,087,117 B2 | 1/2012 | Kapoor |
| 8,095,238 B2 | 1/2012 | Jones |
| 8,095,336 B2 | 1/2012 | Goncalves |
| 8,107,318 B2 | 1/2012 | Chiappetta |
| 8,108,092 B2 | 1/2012 | Phillips |
| 8,109,191 B1 | 2/2012 | Rudakevych |
| 8,112,942 B2 | 2/2012 | Bohm |
| 8,113,304 B2 | 2/2012 | Won |
| 8,122,982 B2 | 2/2012 | Morey |
| 8,127,396 B2 | 3/2012 | Mangiardi |
| 8,127,399 B2 | 3/2012 | Dilger |
| 8,127,704 B2 | 3/2012 | Vosburgh |
| 8,136,200 B2 | 3/2012 | Splinter |
| 8,150,650 B2 | 4/2012 | Goncalves |
| D659,311 S | 5/2012 | Joseph |
| 8,166,904 B2 | 5/2012 | Israel |
| 8,195,333 B2 | 6/2012 | Ziegler |
| 8,196,251 B2 | 6/2012 | Lynch |
| 8,199,109 B2 | 6/2012 | Robbins |
| 8,200,600 B2 | 6/2012 | Rosenstein |
| 8,200,700 B2 | 6/2012 | Moore |
| 8,237,389 B2 | 8/2012 | Fitch |
| 8,237,920 B2 | 8/2012 | Jones |
| 8,239,992 B2 | 8/2012 | Schnittman |
| 8,244,469 B2 | 8/2012 | Cheung |
| 8,253,368 B2 | 8/2012 | Landry |
| 8,255,092 B2 | 8/2012 | Phillips |
| 8,256,542 B2 | 9/2012 | Couture |
| 8,265,793 B2 | 9/2012 | Cross |
| 8,274,406 B2 | 9/2012 | Karlsson |

(56) References Cited

U.S. PATENT DOCUMENTS

| | | |
|---|---|---|
| 8,281,703 B2 | 10/2012 | Moore |
| 8,281,731 B2 | 10/2012 | Vosburgh |
| 8,290,619 B2 | 10/2012 | McLurkin |
| 8,292,007 B2 | 10/2012 | DeFazio |
| 8,295,125 B2 | 10/2012 | Chiappetta |
| D670,877 S | 11/2012 | Joseph |
| 8,308,529 B2 | 11/2012 | DAmbra |
| 8,311,674 B2 | 11/2012 | Abramson |
| 8,316,971 B2 | 11/2012 | Couture |
| 8,318,499 B2 | 11/2012 | Fritchie |
| D672,928 S | 12/2012 | Swett |
| 8,322,470 B2 | 12/2012 | Ohm |
| 8,326,469 B2 | 12/2012 | Phillips |
| 8,327,960 B2 | 12/2012 | Couture |
| 8,336,479 B2 | 12/2012 | Vosburgh |
| 8,342,271 B2 | 1/2013 | Filippov |
| 8,347,088 B2 | 1/2013 | Moore |
| 8,347,444 B2 | 1/2013 | Schnittman |
| 8,350,810 B2 | 1/2013 | Robbins |
| 8,353,373 B2 | 1/2013 | Rudakevych |
| 8,364,309 B1 | 1/2013 | Bailey |
| 8,364,310 B2 | 1/2013 | Jones |
| 8,365,848 B2 | 2/2013 | Won |
| 8,368,339 B2 | 2/2013 | Jones |
| 8,370,985 B2 | 2/2013 | Schnittman |
| 8,374,721 B2 | 2/2013 | Halloran |
| 8,375,838 B2 | 2/2013 | Rudakevych |
| 8,378,613 B2 | 2/2013 | Landry |
| 8,380,350 B2 | 2/2013 | Ozick |
| 8,382,906 B2 | 2/2013 | Konandreas |
| 8,386,081 B2 | 2/2013 | Landry |
| 8,387,193 B2 | 3/2013 | Ziegler |
| 8,390,251 B2 | 3/2013 | Cohen |
| 8,392,021 B2 | 3/2013 | Konandreas |
| 8,396,592 B2 | 3/2013 | Jones |
| 8,396,611 B2 | 3/2013 | Phillips |
| 8,402,586 B2 | 3/2013 | Lavabre |
| 8,408,956 B1 | 4/2013 | Vosburgh |
| 8,412,377 B2 | 4/2013 | Casey |
| 8,413,752 B2 | 4/2013 | Page |
| 8,417,188 B1 | 4/2013 | Vosburgh |
| 8,417,383 B2 | 4/2013 | Ozick |
| 8,418,303 B2 | 4/2013 | Kapoor |
| 8,418,642 B2 | 4/2013 | Vosburgh |
| 8,428,778 B2 | 4/2013 | Landry |
| 8,433,442 B2 | 4/2013 | Friedman |
| D682,362 S | 5/2013 | Mozeika |
| 8,438,694 B2 | 5/2013 | Kim |
| 8,438,695 B2 | 5/2013 | Gilbert, Jr. |
| 8,438,698 B2 | 5/2013 | Kim |
| 8,447,440 B2 | 5/2013 | Phillips |
| 8,447,613 B2 | 5/2013 | Hussey |
| 8,452,448 B2 | 5/2013 | Pack |
| 8,453,289 B2 | 6/2013 | Lynch |
| 8,456,125 B2 | 6/2013 | Landry |
| 8,461,803 B2 | 6/2013 | Cohen |
| 8,463,438 B2 | 6/2013 | Jones |
| 8,473,140 B2 | 6/2013 | Norris |
| 8,474,090 B2 | 7/2013 | Jones |
| 8,478,442 B2 | 7/2013 | Casey |
| 8,485,330 B2 | 7/2013 | Pack |
| 8,505,158 B2 | 8/2013 | Han |
| 8,508,388 B2 | 8/2013 | Karlsson |
| 8,515,578 B2 | 8/2013 | Chiappetta |
| 8,516,651 B2 | 8/2013 | Jones |
| 8,525,995 B2 | 9/2013 | Jones |
| 8,527,113 B2 | 9/2013 | Yamauchi |
| 8,528,157 B2 | 9/2013 | Schnittman |
| 8,528,162 B2 | 9/2013 | Tang |
| 8,528,673 B2 | 9/2013 | More |
| 8,532,822 B2 | 9/2013 | Abramson |
| 8,533,144 B1 | 9/2013 | Reeser |
| 8,534,983 B2 | 9/2013 | Schoenfeld |
| 8,543,562 B2 | 9/2013 | Mule |
| 8,548,626 B2 | 10/2013 | Steltz |
| 8,551,254 B2 | 10/2013 | Dayton |
| 8,551,421 B2 | 10/2013 | Luchinger |
| 8,565,920 B2 | 10/2013 | Casey |
| 8,572,799 B2 | 11/2013 | Won |
| 8,584,305 B2 | 11/2013 | Won |
| 8,584,306 B2 | 11/2013 | Chung |
| 8,584,307 B2 | 11/2013 | Won |
| 8,594,840 B1 | 11/2013 | Chiappetta |
| 8,598,829 B2 | 12/2013 | Landry |
| 8,599,645 B2 | 12/2013 | Chiappetta |
| 8,600,553 B2 | 12/2013 | Svendsen |
| 8,606,401 B2 | 12/2013 | Ozick |
| 8,634,956 B1 | 1/2014 | Chiappetta |
| 8,634,958 B1 | 1/2014 | Chiappetta |
| 8,666,523 B2 | 3/2014 | Kim |
| 8,671,513 B2 | 3/2014 | Yoo |
| 8,732,895 B2 | 5/2014 | Cunningham |
| 8,741,013 B2 | 6/2014 | Swett |
| 8,743,286 B2 | 6/2014 | Hasegawa |
| 8,745,194 B2 | 6/2014 | Uribe-Etxebarria Jimenez |
| 8,755,936 B2 | 6/2014 | Friedman |
| 8,761,931 B2 | 6/2014 | Halloran |
| 8,763,200 B2 | 7/2014 | Kim |
| 8,774,970 B2 | 7/2014 | Knopow |
| 8,798,791 B2 | 8/2014 | Li |
| 8,798,792 B2 | 8/2014 | Park |
| 8,799,258 B2 | 8/2014 | Mule |
| 8,838,274 B2 | 9/2014 | Jones |
| 8,839,477 B2 | 9/2014 | Schnittman |
| 8,843,245 B2 | 9/2014 | Choe |
| 8,855,914 B1 | 10/2014 | Alexander |
| 8,874,264 B1 | 10/2014 | Chiappetta |
| 8,881,339 B2 | 11/2014 | Gilbert |
| 8,924,042 B2 | 12/2014 | Kim |
| 8,961,695 B2 | 2/2015 | Romanov |
| 8,985,127 B2 | 3/2015 | Konandreas |
| 8,996,172 B2 | 3/2015 | Shah |
| 9,033,079 B2 | 5/2015 | Shin |
| 9,037,396 B2 | 5/2015 | Pack |
| 9,043,021 B1 * | 5/2015 | Clark ............... G06F 16/2365 901/1 |
| 9,144,361 B2 | 9/2015 | Landry |
| 9,392,920 B2 | 7/2016 | Halloran |
| 9,468,352 B2 | 10/2016 | Klüssendorff et al. |
| 9,596,971 B2 | 3/2017 | Yoon |
| 9,687,132 B2 | 6/2017 | Schlischka |
| 10,045,675 B2 | 8/2018 | Haegermarck |
| 2001/0004719 A1 | 6/2001 | Sommer |
| 2001/0037163 A1 | 11/2001 | Allard |
| 2002/0016649 A1 | 2/2002 | Jones |
| 2002/0091466 A1 | 7/2002 | Song |
| 2002/0108635 A1 | 8/2002 | Marrero |
| 2002/0121288 A1 | 9/2002 | Marrero |
| 2002/0121561 A1 | 9/2002 | Marrero |
| 2002/0164932 A1 | 11/2002 | Kamimura |
| 2002/0174506 A1 | 11/2002 | Wallach |
| 2002/0185071 A1 | 12/2002 | Guo |
| 2002/0189871 A1 | 12/2002 | Won |
| 2003/0000034 A1 | 1/2003 | Welsh |
| 2003/0025472 A1 | 2/2003 | Jones |
| 2003/0030398 A1 | 2/2003 | Jacobs |
| 2003/0120972 A1 | 6/2003 | Matsushima |
| 2003/0140449 A1 | 7/2003 | Alton |
| 2003/0159223 A1 | 8/2003 | Plankenhorn |
| 2003/0167000 A1 | 9/2003 | Mullick |
| 2003/0229421 A1 | 12/2003 | Chmura |
| 2004/0020000 A1 | 2/2004 | Jones |
| 2004/0031111 A1 | 2/2004 | Ia |
| 2004/0031121 A1 | 2/2004 | Martin |
| 2004/0034952 A1 | 2/2004 | Ho |
| 2004/0049877 A1 | 3/2004 | Jones |
| 2004/0049878 A1 | 3/2004 | Thomas |
| 2004/0074038 A1 | 4/2004 | Im |
| 2004/0074039 A1 | 4/2004 | Kim |
| 2004/0088081 A1 | 5/2004 | Song et al. |
| 2004/0098167 A1 | 5/2004 | Yi |
| 2004/0111184 A1 | 6/2004 | Chiappetta |
| 2004/0111827 A1 | 6/2004 | Im |
| 2004/0167667 A1 | 8/2004 | Goncalves |

(56) References Cited

U.S. PATENT DOCUMENTS

| | | |
|---|---|---|
| 2004/0181896 A1 | 9/2004 | Egawa |
| 2004/0182839 A1 | 9/2004 | Denney |
| 2004/0182840 A1 | 9/2004 | Denney |
| 2004/0185011 A1 | 9/2004 | Alexander |
| 2004/0187249 A1 | 9/2004 | Jones |
| 2004/0207355 A1 | 10/2004 | Jones |
| 2004/0208212 A1 | 10/2004 | Denney |
| 2004/0210343 A1 | 10/2004 | Kim |
| 2004/0220707 A1 | 11/2004 | Pallister |
| 2005/0010331 A1 | 1/2005 | Taylor |
| 2005/0015912 A1 | 1/2005 | Kim |
| 2005/0015915 A1 | 1/2005 | Thomas |
| 2005/0028315 A1 | 2/2005 | Thomas |
| 2005/0028316 A1 | 2/2005 | Thomas |
| 2005/0042151 A1 | 2/2005 | Alward |
| 2005/0065662 A1 | 3/2005 | Reindle |
| 2005/0085947 A1 | 4/2005 | Aldred |
| 2005/0088643 A1 | 4/2005 | Anderson |
| 2005/0156562 A1 | 7/2005 | Cohen |
| 2005/0166354 A1 | 8/2005 | Uehigashi |
| 2005/0191949 A1 | 9/2005 | Kamimura |
| 2005/0217061 A1 | 10/2005 | Reindle |
| 2005/0223514 A1 | 10/2005 | Stuchlik |
| 2005/0229340 A1 | 10/2005 | Sawalski |
| 2005/0230166 A1 | 10/2005 | Petersson |
| 2005/0234611 A1 | 10/2005 | Uehigashi |
| 2005/0251292 A1 | 11/2005 | Casey |
| 2005/0251457 A1 | 11/2005 | Kashiwagi |
| 2005/0251947 A1 | 11/2005 | Lee |
| 2005/0267629 A1 | 12/2005 | Petersson |
| 2005/0278888 A1 | 12/2005 | Reindle |
| 2005/0287038 A1 | 12/2005 | Dubrovsky |
| 2006/0009879 A1 | 1/2006 | Lynch |
| 2006/0010799 A1 | 1/2006 | Bohm |
| 2006/0020369 A1 | 1/2006 | Taylor |
| 2006/0028306 A1 | 2/2006 | Hukuba |
| 2006/0032013 A1 | 2/2006 | Kim |
| 2006/0045981 A1 | 3/2006 | Tsushi |
| 2006/0076039 A1 | 4/2006 | Song |
| 2006/0095158 A1 | 5/2006 | Lee |
| 2006/0136096 A1 | 6/2006 | Chiappetta |
| 2006/0144834 A1 | 7/2006 | Denney |
| 2006/0178777 A1 | 8/2006 | Park |
| 2006/0190133 A1 | 8/2006 | Konandreas |
| 2006/0190134 A1 | 8/2006 | Ziegler |
| 2006/0190146 A1 | 8/2006 | Morse |
| 2006/0195015 A1 | 8/2006 | Mullick |
| 2006/0200281 A1 | 9/2006 | Ziegler |
| 2006/0213025 A1 | 9/2006 | Sawalski |
| 2006/0235570 A1 | 10/2006 | Jung |
| 2006/0235585 A1 | 10/2006 | Tanaka |
| 2006/0236492 A1 | 10/2006 | Sudo |
| 2006/0288519 A1 | 12/2006 | Jaworski |
| 2006/0293788 A1 | 12/2006 | Pogodin |
| 2007/0016328 A1 | 1/2007 | Ziegler |
| 2007/0021867 A1 | 1/2007 | Woo |
| 2007/0059441 A1 | 3/2007 | Greer |
| 2007/0061040 A1 | 3/2007 | Augenbraun |
| 2007/0114975 A1 | 5/2007 | Cohen |
| 2007/0118248 A1 | 5/2007 | Lee |
| 2007/0124890 A1 | 6/2007 | Erko |
| 2007/0143950 A1 | 6/2007 | Lin |
| 2007/0156286 A1 | 7/2007 | Yamauchi |
| 2007/0179670 A1 | 8/2007 | Chiappetta |
| 2007/0189347 A1 | 8/2007 | Denney |
| 2007/0204426 A1 | 9/2007 | Nakagawa |
| 2007/0213892 A1 | 9/2007 | Jones |
| 2007/0214601 A1 | 9/2007 | Chung |
| 2007/0234492 A1 | 10/2007 | Svendsen |
| 2007/0244610 A1 | 10/2007 | Ozick |
| 2007/0266508 A1 | 11/2007 | Jones |
| 2007/0267230 A1 | 11/2007 | Won |
| 2007/0267570 A1 | 11/2007 | Park |
| 2007/0267998 A1 | 11/2007 | Cohen |
| 2007/0273864 A1 | 11/2007 | Cho |
| 2007/0276541 A1 | 11/2007 | Sawasaki |
| 2007/0285041 A1 | 12/2007 | Jones |
| 2007/0289267 A1 | 12/2007 | Makarov |
| 2007/0290649 A1 | 12/2007 | Jones |
| 2008/0000041 A1 | 1/2008 | Jones |
| 2008/0000042 A1 | 1/2008 | Jones |
| 2008/0001566 A1 | 1/2008 | Jones |
| 2008/0007203 A1 | 1/2008 | Cohen |
| 2008/0009964 A1 | 1/2008 | Bruemmer |
| 2008/0015738 A1 | 1/2008 | Casey |
| 2008/0016631 A1 | 1/2008 | Casey |
| 2008/0037170 A1 | 2/2008 | Saiiba |
| 2008/0039974 A1 | 2/2008 | Sandin |
| 2008/0047092 A1 | 2/2008 | Schnittman |
| 2008/0051953 A1 | 2/2008 | Jones |
| 2008/0007193 A1 | 3/2008 | Bow |
| 2008/0052846 A1 | 3/2008 | Kapoor |
| 2008/0058987 A1 | 3/2008 | Ozick |
| 2008/0063400 A1 | 3/2008 | Hudson |
| 2008/0065265 A1 | 3/2008 | Ozick |
| 2008/0077278 A1 | 3/2008 | Park |
| 2008/0084174 A1 | 4/2008 | Jones |
| 2008/0086241 A1 | 4/2008 | Phillips |
| 2008/0091304 A1 | 4/2008 | Ozick |
| 2008/0091305 A1 | 4/2008 | Svendsen |
| 2008/0093131 A1 | 4/2008 | Couture |
| 2008/0098553 A1 | 5/2008 | Dayton |
| 2008/0105445 A1 | 5/2008 | Dayton |
| 2008/0109126 A1 | 5/2008 | Sandin |
| 2008/0121097 A1 | 5/2008 | Rudakevych |
| 2008/0127445 A1 | 6/2008 | Konandreas |
| 2008/0127446 A1 | 6/2008 | Ziegler |
| 2008/0133052 A1 | 6/2008 | Jones |
| 2008/0134457 A1 | 6/2008 | Morse |
| 2008/0134458 A1 | 6/2008 | Ziegler |
| 2008/0140255 A1 | 6/2008 | Ziegler |
| 2008/0143063 A1 | 6/2008 | Won |
| 2008/0143064 A1 | 6/2008 | Won |
| 2008/0143065 A1 | 6/2008 | DeFazio |
| 2008/0152871 A1 | 6/2008 | Greer |
| 2008/0155768 A1 | 7/2008 | Ziegler |
| 2008/0179115 A1 | 7/2008 | Ohm |
| 2008/0183332 A1 | 7/2008 | Ohm |
| 2008/0184518 A1 | 8/2008 | Taylor |
| 2008/0196946 A1 | 8/2008 | Filippov |
| 2008/0205194 A1 | 8/2008 | Chiappetta |
| 2008/0209665 A1 | 9/2008 | Mangiardi |
| 2008/0221729 A1 | 9/2008 | Lavarec |
| 2008/0223630 A1 | 9/2008 | Couture |
| 2008/0235897 A1 | 10/2008 | Kim |
| 2008/0236907 A1 | 10/2008 | Won |
| 2008/0264456 A1 | 10/2008 | Lynch |
| 2008/0266254 A1 | 10/2008 | Robbins |
| 2008/0276407 A1 | 11/2008 | Schnittman |
| 2008/0276408 A1 | 11/2008 | Gilbert |
| 2008/0281470 A1 | 11/2008 | Gilbert |
| 2008/0282494 A1 | 11/2008 | Won |
| 2008/0294288 A1 | 11/2008 | Yamauchi |
| 2008/0307590 A1 | 12/2008 | Jones |
| 2009/0007366 A1 | 1/2009 | Svendsen |
| 2009/0025155 A1 | 1/2009 | Nishiyama |
| 2009/0030551 A1 | 1/2009 | Hein |
| 2009/0037024 A1 | 2/2009 | Jamieson |
| 2009/0038089 A1 | 2/2009 | Landry |
| 2009/0044370 A1 | 2/2009 | Won |
| 2009/0045766 A1 | 2/2009 | Casey |
| 2009/0055022 A1 | 2/2009 | Casey |
| 2009/0065271 A1 | 3/2009 | Won |
| 2009/0070946 A1 | 3/2009 | Tamada |
| 2009/0078035 A1 | 3/2009 | Mecca |
| 2009/0107738 A1 | 4/2009 | Won |
| 2009/0125175 A1 | 5/2009 | Park |
| 2009/0126143 A1 | 5/2009 | Haegermarck |
| 2009/0133720 A1 | 5/2009 | Vandenbogert |
| 2009/0145671 A1 | 6/2009 | Filippov |
| 2009/0173553 A1 | 7/2009 | Won |
| 2009/0180668 A1 | 7/2009 | Jones |
| 2009/0226113 A1 | 9/2009 | Matsumoto |
| 2009/0232506 A1 | 9/2009 | Hudson |

(56) References Cited

U.S. PATENT DOCUMENTS

| | | |
|---|---|---|
| 2009/0241826 A1 | 10/2009 | Vosburgh |
| 2009/0254217 A1 | 10/2009 | Pack |
| 2009/0254218 A1 | 10/2009 | Sandin |
| 2009/0265036 A1 | 10/2009 | Jamieson |
| 2009/0270015 A1 | 10/2009 | DAmbra |
| 2009/0274602 A1 | 11/2009 | Alward |
| 2009/0281661 A1 | 11/2009 | Dooley |
| 2009/0292393 A1 | 11/2009 | Casey |
| 2009/0292884 A1 | 11/2009 | Wang |
| 2009/0314318 A1 | 12/2009 | Chang |
| 2009/0314554 A1 | 12/2009 | Couture |
| 2009/0319083 A1 | 12/2009 | Jones |
| 2010/0001478 A1 | 1/2010 | DeFazio |
| 2010/0011529 A1 | 1/2010 | Won |
| 2010/0037418 A1 | 2/2010 | Hussey |
| 2010/0049364 A1 | 2/2010 | Landry |
| 2010/0049365 A1 | 2/2010 | Jones |
| 2010/0049391 A1 | 2/2010 | Nakano |
| 2010/0063628 A1 | 3/2010 | Landry |
| 2010/0075054 A1 | 3/2010 | Kaneyama |
| 2010/0076600 A1 | 3/2010 | Cross |
| 2010/0078415 A1 | 4/2010 | Denney |
| 2010/0082193 A1 | 4/2010 | Chiappetta |
| 2010/0107355 A1 | 5/2010 | Won |
| 2010/0108098 A1 | 5/2010 | Splinter |
| 2010/0115716 A1 | 5/2010 | Landry |
| 2010/0116566 A1 | 5/2010 | Ohm |
| 2010/0125968 A1 | 5/2010 | Ho |
| 2010/0139029 A1 | 6/2010 | Kim |
| 2010/0139995 A1 | 6/2010 | Rudakevych |
| 2010/0161225 A1 | 6/2010 | Hyung |
| 2010/0173070 A1 | 7/2010 | Niu |
| 2010/0206336 A1 | 8/2010 | Souid |
| 2010/0217436 A1 | 8/2010 | Jones |
| 2010/0257690 A1 | 10/2010 | Jones |
| 2010/0257691 A1 | 10/2010 | Jones |
| 2010/0263142 A1 | 10/2010 | Jones |
| 2010/0263158 A1 | 10/2010 | Jones |
| 2010/0268384 A1 | 10/2010 | Jones |
| 2010/0275405 A1 | 11/2010 | Morse |
| 2010/0286791 A1 | 11/2010 | Goldsmith |
| 2010/0305752 A1 | 12/2010 | Abramson |
| 2010/0312429 A1 | 12/2010 | Jones |
| 2010/0313910 A1 | 12/2010 | Lee |
| 2010/0313912 A1 | 12/2010 | Han |
| 2011/0000363 A1 | 1/2011 | More |
| 2011/0004339 A1 | 1/2011 | Ozick |
| 2011/0010873 A1 | 1/2011 | Kim |
| 2011/0077802 A1 | 3/2011 | Halloran |
| 2011/0082668 A1 | 4/2011 | Escrig |
| 2011/0088609 A1 | 4/2011 | Vosburgh |
| 2011/0109549 A1 | 5/2011 | Robbins |
| 2011/0125323 A1 | 5/2011 | Gutmann |
| 2011/0131741 A1 | 6/2011 | Jones |
| 2011/0154589 A1 | 6/2011 | Reindle |
| 2011/0202175 A1 | 8/2011 | Romanov |
| 2011/0209726 A1 | 9/2011 | Dayton |
| 2011/0252594 A1 | 10/2011 | Blouin |
| 2011/0258789 A1 | 10/2011 | Lavabre |
| 2011/0271469 A1 | 11/2011 | Ziegler |
| 2011/0277269 A1 | 11/2011 | Kim |
| 2011/0286886 A1 | 11/2011 | Luchinger |
| 2011/0288684 A1 | 11/2011 | Farlow |
| 2012/0011668 A1 | 1/2012 | Schnittman |
| 2012/0011669 A1 | 1/2012 | Schnittman |
| 2012/0011676 A1 | 1/2012 | Jung |
| 2012/0011677 A1 | 1/2012 | Jung |
| 2012/0011992 A1 | 1/2012 | Rudakevych |
| 2012/0036659 A1 | 2/2012 | Ziegler |
| 2012/0047676 A1 | 3/2012 | Jung |
| 2012/0049798 A1 | 3/2012 | Cohen |
| 2012/0079670 A1 | 4/2012 | Yoon |
| 2012/0083924 A1 | 4/2012 | Jones |
| 2012/0084934 A1 | 4/2012 | Li |
| 2012/0084937 A1 | 4/2012 | Won |
| 2012/0084938 A1 | 4/2012 | Fu |
| 2012/0085368 A1 | 4/2012 | Landry |
| 2012/0090133 A1 | 4/2012 | Kim |
| 2012/0095619 A1 | 4/2012 | Pack |
| 2012/0096656 A1 | 4/2012 | Jung |
| 2012/0097783 A1 | 4/2012 | Pack |
| 2012/0101661 A1 | 4/2012 | Phillips |
| 2012/0102670 A1 | 5/2012 | Jang |
| 2012/0109423 A1 | 5/2012 | Pack |
| 2012/0110755 A1 | 5/2012 | Liu |
| 2012/0118216 A1 | 5/2012 | Vosburgh |
| 2012/0125363 A1 | 5/2012 | Kim |
| 2012/0137464 A1 | 6/2012 | Thatcher |
| 2012/0137949 A1 | 6/2012 | Vosburgh |
| 2012/0151709 A1 | 6/2012 | Tang |
| 2012/0152280 A1 | 6/2012 | Bosses |
| 2012/0152877 A1 | 6/2012 | Tadayon |
| 2012/0159725 A1 | 6/2012 | Kapoor |
| 2012/0166024 A1 | 6/2012 | Phillips |
| 2012/0167917 A1 | 7/2012 | Gilbert |
| 2012/0169497 A1 | 7/2012 | Schnittman |
| 2012/0173018 A1 | 7/2012 | Allen |
| 2012/0173070 A1 | 7/2012 | Schnittman |
| 2012/0180254 A1 | 7/2012 | Morse |
| 2012/0180712 A1 | 7/2012 | Vosburgh |
| 2012/0181099 A1 | 7/2012 | Moon |
| 2012/0182392 A1 | 7/2012 | Kearns |
| 2012/0183382 A1 | 7/2012 | Couture |
| 2012/0185091 A1 | 7/2012 | Field |
| 2012/0185094 A1 | 7/2012 | Rosenstein |
| 2012/0185095 A1 | 7/2012 | Rosenstein |
| 2012/0185096 A1 | 7/2012 | Rosenstein |
| 2012/0192898 A1 | 8/2012 | Lynch |
| 2012/0194395 A1 | 8/2012 | Williams |
| 2012/0197439 A1 | 8/2012 | Wang |
| 2012/0197464 A1 | 8/2012 | Wang |
| 2012/0199006 A1 | 8/2012 | Swett |
| 2012/0199407 A1 | 8/2012 | Morey |
| 2012/0200149 A1 | 8/2012 | Rudakevych |
| 2012/0222224 A1 | 9/2012 | Yoon |
| 2012/0246862 A1 | 10/2012 | Landry |
| 2012/0260443 A1 | 10/2012 | Lindgren |
| 2012/0260861 A1 | 10/2012 | Lindgren |
| 2012/0261204 A1 | 10/2012 | Won |
| 2012/0265346 A1 | 10/2012 | Gilbert |
| 2012/0265391 A1 | 10/2012 | Letsky |
| 2012/0268587 A1 | 10/2012 | Robbins |
| 2012/0281829 A1 | 11/2012 | Rudakevych |
| 2012/0298029 A1 | 11/2012 | Vosburgh |
| 2012/0303160 A1 | 11/2012 | Ziegler |
| 2012/0311810 A1 | 12/2012 | Gilbert |
| 2012/0312221 A1 | 12/2012 | Vosburgh |
| 2012/0317745 A1 | 12/2012 | Jung |
| 2012/0322349 A1 | 12/2012 | Josi |
| 2013/0015596 A1 | 1/2013 | Mozeika |
| 2013/0025085 A1 | 1/2013 | Kim |
| 2013/0031734 A1 | 2/2013 | Porat |
| 2013/0032078 A1 | 2/2013 | Yahnker |
| 2013/0035793 A1 | 2/2013 | Neumann |
| 2013/0047368 A1 | 2/2013 | Tran |
| 2013/0054022 A1* | 2/2013 | Jang ............... A47L 9/2805 700/245 |
| 2013/0054029 A1 | 2/2013 | Huang |
| 2013/0054129 A1 | 2/2013 | Wong |
| 2013/0060357 A1 | 3/2013 | Li |
| 2013/0060379 A1 | 3/2013 | Choe |
| 2013/0070563 A1 | 3/2013 | Chiappetta |
| 2013/0081218 A1 | 4/2013 | Kim |
| 2013/0085603 A1 | 4/2013 | Chiappetta |
| 2013/0086760 A1 | 4/2013 | Han |
| 2013/0092190 A1 | 4/2013 | Yoon |
| 2013/0098402 A1 | 4/2013 | Yoon |
| 2013/0103194 A1 | 4/2013 | Jones |
| 2013/0105233 A1 | 5/2013 | Couture |
| 2013/0117952 A1 | 5/2013 | Schnittman |
| 2013/0118524 A1 | 5/2013 | Konandreas |
| 2013/0138337 A1 | 5/2013 | Pack |
| 2013/0145572 A1 | 6/2013 | Schregardus |
| 2013/0152724 A1 | 6/2013 | Mozeika |

(56) References Cited

U.S. PATENT DOCUMENTS

| | | |
|---|---|---|
| 2013/0160226 A1 | 6/2013 | Lee |
| 2013/0166107 A1 | 6/2013 | Robbins |
| 2013/0174371 A1 | 7/2013 | Jones |
| 2013/0204463 A1 | 8/2013 | Chiappetta |
| 2013/0204465 A1 | 8/2013 | Phillips |
| 2013/0204483 A1 | 8/2013 | Sung |
| 2013/0205520 A1 | 8/2013 | Kapoor |
| 2013/0206170 A1 | 8/2013 | Svendsen |
| 2013/0206177 A1 | 8/2013 | Burlutskiy |
| 2013/0211589 A1 | 8/2013 | Landry |
| 2013/0214498 A1 | 8/2013 | DeFazio |
| 2013/0226344 A1 | 8/2013 | Wong |
| 2013/0227801 A1 | 9/2013 | Kim |
| 2013/0227812 A1 | 9/2013 | Kim |
| 2013/0228198 A1 | 9/2013 | Hung |
| 2013/0228199 A1 | 9/2013 | Hung |
| 2013/0231779 A1 | 9/2013 | Purkayastha |
| 2013/0231819 A1 | 9/2013 | Hung |
| 2013/0232702 A1 | 9/2013 | Baek |
| 2013/0239870 A1 | 9/2013 | Hudson |
| 2013/0241217 A1 | 9/2013 | Hickey |
| 2013/0253701 A1 | 9/2013 | Halloran |
| 2013/0256042 A1 | 10/2013 | Rudakevych |
| 2013/0268118 A1 | 10/2013 | Grinstead |
| 2013/0269148 A1 | 10/2013 | Chiu |
| 2013/0273252 A1 | 10/2013 | Miyamoto |
| 2013/0298350 A1 | 11/2013 | Schnittman |
| 2013/0310978 A1 | 11/2013 | Ozick |
| 2013/0325178 A1 | 12/2013 | Jones |
| 2013/0331987 A1 | 12/2013 | Karlsson |
| 2013/0338525 A1 | 12/2013 | Allen |
| 2013/0338828 A1 | 12/2013 | Chiappetta |
| 2013/0338831 A1 | 12/2013 | Noh |
| 2013/0340201 A1 | 12/2013 | Jang |
| 2014/0016469 A1 | 1/2014 | Ho |
| 2014/0026338 A1 | 1/2014 | Kim |
| 2014/0026339 A1 | 1/2014 | Konandreas |
| 2014/0053351 A1 | 2/2014 | Kapoor |
| 2014/0100736 A1* | 4/2014 | Kim .................... G05D 1/0219 |
| | | 15/49.1 |
| 2014/0109339 A1 | 4/2014 | Won |
| 2014/0123325 A1 | 5/2014 | Jung |
| 2014/0130272 A1 | 5/2014 | Won |
| 2014/0142757 A1 | 5/2014 | Ziegler |
| 2014/0167931 A1 | 6/2014 | Lee |
| 2014/0180968 A1 | 6/2014 | Song |
| 2014/0207280 A1 | 7/2014 | Duffley |
| 2014/0207281 A1 | 7/2014 | Angle |
| 2014/0207282 A1 | 7/2014 | Angle |
| 2014/0238440 A1 | 8/2014 | Dayton |
| 2014/0249671 A1 | 9/2014 | Halloran |
| 2014/0283326 A1 | 9/2014 | Song |
| 2014/0303775 A1* | 10/2014 | Oh ...................... B25J 9/0003 |
| | | 901/1 |
| 2015/0005937 A1 | 1/2015 | Ponulak |
| 2015/0032259 A1 | 1/2015 | Kim |
| 2015/0033488 A1 | 2/2015 | Varila |
| 2015/0039127 A1 | 2/2015 | Matsumoto |
| 2015/0057800 A1 | 2/2015 | Cohen |
| 2015/0120056 A1 | 4/2015 | Noh |
| 2015/0185322 A1 | 7/2015 | Haegermarck |
| 2015/0197012 A1 | 7/2015 | Schnittman |
| 2015/0206015 A1 | 7/2015 | Ramalingam |
| 2015/0223659 A1* | 8/2015 | Han ..................... A47L 11/4011 |
| | | 134/18 |
| 2015/0265122 A1 | 9/2015 | Han |
| 2016/0202703 A1 | 7/2016 | Matsubara |
| 2016/0306359 A1 | 10/2016 | Lindhe |
| 2016/0316982 A1 | 11/2016 | Kim |
| 2017/0273521 A1 | 9/2017 | Klintemyr |
| 2017/0273524 A1 | 9/2017 | Klintemyr |
| 2018/0103812 A1 | 4/2018 | Lee |

FOREIGN PATENT DOCUMENTS

| | | |
|---|---|---|
| CN | 1668238 | 9/2005 |
| CN | 101161174 | 4/2008 |
| CN | 100388142 | 5/2008 |
| CN | 101297267 | 10/2008 |
| CN | 102083352 | 6/2011 |
| CN | 103027634 | 4/2013 |
| CN | 103054516 | 4/2013 |
| CN | 103491838 | 1/2014 |
| CN | 103565373 | 2/2014 |
| CN | 103976694 | 8/2014 |
| CN | 203841627 | 9/2014 |
| DE | 3536907 | 4/1986 |
| DE | 9307500 | 7/1993 |
| DE | 4211789 | 10/1993 |
| DE | 4340367 | 6/1995 |
| DE | 4439427 | 5/1996 |
| DE | 19849978 | 5/2000 |
| DE | 202008017137 | 3/2009 |
| DE | 102010000174 | 7/2011 |
| DE | 102010000573 | 9/2011 |
| DE | 102010037672 | 3/2012 |
| EP | 0142594 | 5/1985 |
| EP | 0358628 | 3/1990 |
| EP | 0474542 | 3/1992 |
| EP | 0569984 | 11/1993 |
| EP | 0606173 | 7/1994 |
| EP | 1099143 | 11/2003 |
| EP | 1360922 | 11/2003 |
| EP | 1441271 | 7/2004 |
| EP | 1331537 | 8/2005 |
| EP | 2050380 | 4/2009 |
| EP | 1969438 | 9/2009 |
| EP | 2296005 | 3/2011 |
| EP | 1395888 | 5/2011 |
| EP | 2316322 | 5/2011 |
| EP | 2251757 | 11/2011 |
| EP | 2417894 | 2/2012 |
| EP | 2438843 | 4/2012 |
| EP | 2447800 | 5/2012 |
| EP | 2466411 | 6/2012 |
| EP | 2561787 | 2/2013 |
| EP | 2578125 | 4/2013 |
| EP | 2583608 | 4/2013 |
| EP | 2583609 | 4/2013 |
| EP | 2604163 | 6/2013 |
| EP | 2741483 | 6/2014 |
| EP | 2772815 | 9/2014 |
| EP | 2992803 | 3/2016 |
| FR | 2999410 | 6/2014 |
| GB | 1447943 | 9/1976 |
| GB | 2355523 | 4/2001 |
| GB | 2382251 | 5/2003 |
| GB | 2494446 | 3/2013 |
| GB | 2884364 | 6/2015 |
| JP | 5540959 | 3/1980 |
| JP | 6286414 | 4/1987 |
| JP | 62109528 | 5/1987 |
| JP | 62120510 | 6/1987 |
| JP | 62152421 | 7/1987 |
| JP | 62152424 | 7/1987 |
| JP | 63127310 | 5/1988 |
| JP | 63181727 | 7/1988 |
| JP | 63241610 | 10/1988 |
| JP | 03162814 | 7/1991 |
| JP | 03166074 | 7/1991 |
| JP | 04260905 | 9/1992 |
| JP | 0584200 | 4/1993 |
| JP | 0584210 | 4/1993 |
| JP | 05084200 | 4/1993 |
| JP | 05189041 | 7/1993 |
| JP | 05224745 | 9/1993 |
| JP | 05228090 | 9/1993 |
| JP | 064133 | 1/1994 |
| JP | 0683442 | 3/1994 |
| JP | 06125861 | 5/1994 |
| JP | 06144215 | 5/1994 |
| JP | 06179145 | 6/1994 |

(56) References Cited

FOREIGN PATENT DOCUMENTS

| | | |
|---|---|---|
| JP | 075922 | 1/1995 |
| JP | 0759695 | 3/1995 |
| JP | 07129239 | 5/1995 |
| JP | 07281742 | 10/1995 |
| JP | 08089455 | 4/1996 |
| JP | 08326025 | 12/1996 |
| JP | 0944240 | 2/1997 |
| JP | 09150741 | 6/1997 |
| JP | 09185410 | 7/1997 |
| JP | 11267074 | 10/1999 |
| JP | 2001022443 | 1/2001 |
| JP | 2001187009 | 7/2001 |
| JP | 2002287824 | 10/2002 |
| JP | 2002355204 | 12/2002 |
| JP | 2002366228 | 12/2002 |
| JP | 2003180587 | 7/2003 |
| JP | 2003225184 A | 8/2003 |
| JP | 2003280740 | 10/2003 |
| JP | 2004096253 | 3/2004 |
| JP | 2004136144 | 5/2004 |
| JP | 2004166968 | 6/2004 |
| JP | 2004198212 | 7/2004 |
| JP | 2004303134 | 10/2004 |
| JP | 200540597 | 2/2005 |
| JP | 2005124753 | 5/2005 |
| JP | 2005141636 | 6/2005 |
| JP | 2005192609 | 7/2005 |
| JP | 2005314116 | 11/2005 |
| JP | 2006015113 | 1/2006 |
| JP | 2006087507 | 4/2006 |
| JP | 2006231477 | 9/2006 |
| JP | 2006314669 | 11/2006 |
| JP | 2007014369 | 1/2007 |
| JP | 2007070658 | 3/2007 |
| JP | 2007143645 | 6/2007 |
| JP | 2006185438 | 7/2007 |
| JP | 2007213236 | 8/2007 |
| JP | 2007226322 | 9/2007 |
| JP | 2007272665 | 10/2007 |
| JP | 2008132299 | 6/2008 |
| JP | 2008146617 | 6/2008 |
| JP | 2008290184 | 12/2008 |
| JP | 2008543394 | 12/2008 |
| JP | 2009500741 | 1/2009 |
| JP | 2009509220 | 3/2009 |
| JP | 2009193240 | 8/2009 |
| JP | 2010507169 | 3/2010 |
| JP | 201079869 | 4/2010 |
| JP | 2010526594 | 8/2010 |
| JP | 2010534825 | 11/2010 |
| JP | 2011045694 | 3/2011 |
| JP | 2011253361 | 12/2011 |
| JP | 2012216051 | 11/2012 |
| JP | 2013041506 | 2/2013 |
| JP | 2013059625 | 4/2013 |
| JP | 201389256 | 5/2013 |
| JP | 2013089256 | 5/2013 |
| JP | 2013247986 | 12/2013 |
| JP | 2014023930 | 2/2014 |
| JP | 2014193383 | 10/2014 |
| KR | 1020040039094 A | 5/2004 |
| KR | 20040096253 | 11/2004 |
| KR | 20050003112 | 1/2005 |
| KR | 20070070658 | 7/2007 |
| KR | 20090028359 | 3/2009 |
| KR | 101231932 | 3/2013 |
| NL | 7408667 | 1/1975 |
| WO | 8804081 | 6/1988 |
| WO | 9303399 | 2/1993 |
| WO | 9638770 | 12/1996 |
| WO | 0036961 | 6/2000 |
| WO | 0036970 | 6/2000 |
| WO | 0038025 | 6/2000 |
| WO | 0182766 | 11/2001 |
| WO | 03022120 | 3/2003 |
| WO | 03024292 | 3/2003 |
| WO | 2004082899 | 9/2004 |
| WO | 2007008148 | 1/2007 |
| WO | 2007028049 | 3/2007 |
| WO | 2007051972 | 5/2007 |
| WO | 2007065034 | 6/2007 |
| WO | 2008048260 | 4/2008 |
| WO | 2009132317 | 10/2009 |
| WO | 2013105431 | 7/2013 |
| WO | 2013157324 | 10/2013 |
| WO | 2014033055 | 3/2014 |
| WO | 2014151501 | 9/2014 |
| WO | 2015016580 | 2/2015 |
| WO | 2015090402 | 6/2015 |
| WO | 2016005011 | 1/2016 |

OTHER PUBLICATIONS

"SM51 Series Opposed Mode Sensors, DC sensors with metal housings: SM51EB/RB, SM51EB6/RB6", Banner Engineering Corporation, pp. 1-24.

Andersson, et al., "ISR: An intelligent Service Robot", Centre for Autonomous Systems, Royal institute of Technology, S-100 44 Stockholm, Sweden, pp. 1-24.

Berlin, et al. "Development of a Multipurpose Mobile Robot for Concrete Surface Processing", A Status Report, Feb. 1992, Sweden, pp. 1-10.

Borenstein, et ai. "Real-Time Obstacle Avoidance for Fast Mobile Robots", IEEE, Jan. 6, 1996, pp. 1-18.

Braunstingl, et al., "Fuzzy Logic Wall Following of a Mobile Robot Based on the Concept of General Perception", ICAR '95, 7th International Conference on Advanced Robotics, Sant Feliu De Guixois, Spain pp. 367-376., Sep. 1995, pp. 1-9.

Caselli, et al. "Mobile Robot Navigation in Enclosed Large-Scale Space", Italy and U.S.A., pp. 1-5.

Cassens, et al. "Finishing and Maintaining Wood Floors", Wood Finishing, North Central Regional Extension Publication #136, pp. 1-8.

Chinese Office Action for Application No. 201380081331.6, dated Mar. 26, 2018 with translation, 27 pages.

Chinese Office Action for Chinese Applciation No. 201380081537.9, dated Jun. 4, 2018 with translation, 15 pages.

Chinese Office Action for Chinese Application No. 20130075510.9, dated Feb. 6, 2017 with translation, 14 pages.

Chinese Office Action for Chinese Application No. 201380075503.9, dated Feb. 13, 2017 with translation, 18 pages.

Chinese Office Action for Chinese Application No. 201380075503.9, dated Nov. 8, 2017 with translation, 16 pages.

Chinese Office Action for Chinese Application No. 201380075510.9, dated Oct. 27, 2017 with translation, 13 pages.

Chinese Office Action for Chinese Application No. 201380081103.9, dated Feb. 27, 2018, 19 pages.

Chinese Office Action for Chinese Application No. 201380081535.X, dated Mar. 26, 2018, 18 pages.

Chinese Office Action for Chinese Application No. 201580082852.2, dated Mar. 3, 2020, 8 pages.

Chung et al.,"Path Planning for a Mobile Robot With Grid Type World Model", Proceedings of the 1992 IEEE/RSJ International Conference on Intelligent Robots and Systems, Jul. 7-10, 1992, pp. 439-444.

Collins, et al. "Cerebellar Control of a Line Following Robot", Computer Science and Electrical Engineering Department, University of Queensland, St.Lucia, Queensland, 4072 A, pp. 1-6.

Decision for Refusal for Japanese Application No. 2016-526875, dated May 15, 2018 with translation, 6 pages.

Decision of Refusal for Japanese .Application No. 2016-526945, dated May 7, 2017 with translation, 5 pages.

Doty, et al. "Sweep Strategies for a Sensory-Driven, Behavior-Based Vacuum Cleaning Agent", 1993, Machine Intelligence Laboratory-Gainesville Florida, AAAI 1993 Fall Symposium Series— Research Triangle Park—Raleigh, NC, Oct. 22-24, 1993, pp. 1-6.

European Communication Pursuant to Article 94(3) for European Application No. 16176479,0, dated Nov. 27, 2017, 6 pages.

(56) References Cited

OTHER PUBLICATIONS

European Communication Pursuant to Article 94(3) for EP Application No. 13817911.4, dated Apr. 2, 2019, 8 pages.
European Communication Pursuant to Article 94(3) for European Application No. 15759442.5, dated Apr. 17, 2019, 6 pages.
Everett, Sensors For Mobile Robots Theory and Application, A.K. Peters, 1995, Chapters 1 and 3, 70 pages.
Everett, Sensors For Mobile Robots Theory and Application, A.K. Peters, Ltd., 1995, Chapters 15 and 16, 59 pages.
Everett, Sensors for Mobile Robots Theory and Application, A.K. Peters, Ltd., 1995, Chapters 6, 7 and 10, 79 pages.
Everett, Sensors For Mobile Robots Theory and Application, A.K. Peters, Ltd., 1995, Chapters, 4a nd 5, 68 pages.
Everett, et al., "Survey of Collision Avoidance and Ranging Sensors for Mobile Robots", Revision 1, Technical Report 1194, Dec. 1992, pp. 1-154.
Extended European Search Report for European Application No. 16176479.0, dated Nov. 11, 2016, 9 pages.
Extended European Search Report for European Application No. 18157403.9, dated Nov. 14, 2018, 12 pages.
Final Office Action for U.S. Appl. No. 14/409,291, dated Jun. 6, 2017, 21 pages.
Final Office Action for U.S. Appl. No. 14/784,106, dated Mar. 28, 2018, 8 pages.
Final Office Action for U.S. Appl. No. 15/100,667, dated Apr. 21, 2017, 26 pages.
Final Office Action for U.S. Appl. No. 15/100,667, dated Mar. 27, 2018, 8 pages.
Final Office Action for U.S. Appl. No. 15/101,212, dated Oct. 11, 2017, 7 pages.
Final Office Action for U.S. Appl. No. 15/101,235, dated Jan. 11, 2019, 12 pages.
Final Office Action for U.S. Appl. No. 15/101,510, dated Feb. 8, 2019, 16 pages.
Final Office Action for U.S. Appl. No. 15/102,017, dated Jun. 14, 2018, 12 pages.
Gavrilut, et al., "Wall-Following Method for an Autonomous Mobile Robot using Two IR Sensors", 12th WSEAS International Conference on SYSTEMS, Heraklion, Greece, Jul. 22-24, 2008, ISBN: 978-960-6766-83-1, ISSN: 1790-2769, pp. 205-209.
Gutman et al., AMOS: Comparison of Scan Matching Approaches for Self-Localization in Indoor Environments, 1996, IEEE, pp. 61-67.
Herbst, et al., "Micromouse Design Specifications", Jun. 2, 1998, pp. 1-22.
International Preliminary Report, on Patentability for international Application No. PCT/EP2013/077377, dated Jun. 21, 2016, 12 pages.
International Preliminary Report on Patentability for International Application No. PCT/EP2013/077378, dated Jun. 21, 2016, 7 pages.
International Preliminary Report on Patentability for International Application No. PCT/EP2013/077380, dated Jun. 21, 2016, 6 pages.
International Preliminary Report on Patentability for international Application No. PCT/EP2013/077384, dated Jun. 21, 2016, 6 pages.
International Preliminary Report on Patentability for International Application No. PCT/EP2013/077385, dated Jun. 21, 2016, 7 pages.
International Preliminary Report on Patentability for International Application No. PCT/EP2013/077386, dated Jun. 21, 2016, 6 pages.
International Preliminary Report on Patentability for International Application No. PCT/EP2013/077387, dated Jun. 21, 2016, 9 pages.
International Preliminary Report, on Patentability for International Application No. PCT/EP2013/077657, dated Jun. 21, 2016, 7 pages.
International Preliminary Reoort on Patentability for International Application No. PCT/EP2013/077661, dated Jun. 21, 2016, 11 pages.
International Search Report and Written Opinion of the International Searching Authority for International Application No. PCT/EP/2013/077657, dated Aug. 18, 2014, 10 pages.
Internationai Search Report and Written Opinion of the International Searching Authority for International Application No. PCT/EP2012/077377, dated Nov. 6, 2014, 18 pages.
International Search Report and Written Opinion of the International Searching Authority for International Application No. PCT/EP2013/077378, dated Apr. 9, 2014, 9 pages.
International Search Report and Written Opinion of the International Searching Authority for International Application No. PCT/EP2013/077380, dated Jul. 28, 2014, 8 pages.
International Search Report and Written Opinion of the International Searching Authority for International Application No. PCT/EP2013/077384, dated Aug. 14, 2014, 9 pages.
International Search Report and Written Opinion of the International Searching Authority for International Application No. PCT/EP2013/077385, dated May 27, 2045, 9 pages.
International Search Report and Written Opinion of the International Searching Authority for International Application No. PCT/EP2013/077386, dated Sep. 17, 2014, 9 pages.
International Search Report and Written Opinion of the International Searching Authority for International Application No. PCT/EP2013/077387, dated Sep. 30, 2014, 12 pages.
International Search Report and Written Opinion of the International Searching Authority for international Application No. PCT/EP2013/077661, dated Jun. 10, 2014, 15 pages.
International Search Report and Wiillen Opinion of the International Searching Authority for International Application No. PCT/EP2014/069073, dated May 12, 2015, 10 pages.
International Search Report and Written Opinion of the International Searching Authority for International Application No. PCT/EP2014/069074, dated May 11, 2015, 9 pages.
International Search Report and Written Opinion of the International Searching Authority for International Application No. PCT/EP2014/077549, dated Jul. 27, 2015, 9 pages.
International Search Report and Written Opinion of the International Searching Authority for International Application No. PCT/EP2014/077947, dated Jul. 11, 2016, 14 pages.
International Search Report and Written Opinion of the International Searching Authority for International Application No. PCT/EP2014/077954, dated Oct. 12, 2015, 11 pages.
International Search Report and Written Opinion of the International Searching Authority for International Application No. PCT/EP2014/078144, dated Apr. 15, 2015, 8 pages.
International Search Report and Written Opinion of the International Searching Authority for International Application No. PCT/EP2015/058377, dated Aug. 10, 2016, 15 pages.
International Search Report and Written Opinion of the International Searching Authority for international Application No. PCT/EP2015/070140, dated May 27, 2016, 11 pages.
International Search Report and Written Opinion of the International Searching Authority for International Application No. PCT/EP2016/060565, dated Feb. 15, 2017, 12 pages.
International Search Report and Written Opinion of the International Searching Authority for International Application No. PCT/EP2016/060571, dated Feb. 7, 2017, 8 pages.
International Search Report and Written Opinion of the International Searching Authority for International Application No. PCT/EP2016/072291, dated Jun. 6, 2017, 11 pages.
International Search Report and Written Opinion of the International Searching Authority for Internatonal Application No. PCT/EP2014/0077142, dated Sep. 11, 2015, 8 pages.
International Search Report and Written Ooinon for International Application No. PCT/EP2016/055547, dated Jan. 2, 2017, 10 pages.
International Search Report for International Application No. PCT/EP2013/057814 dated Dec. 20, 2013, 5 pages.
International Search Report for International Application No. PCT/EP2013/057815 dated Apr. 2, 2014, 4 pages.
International Search Report for International Application No. PCT/EP2013/067500 dated Dec. 10, 2013, 4 pages.
Japanese Notice of Reasons for Refusal for Japanese Application No. 2018-501313, dated Sep. 19, 2019 with translation, 8 pages.
Japanese Office Action for Application for Japanese Application No. 2015-528969, dated Apr. 7, 2017 with translation, 4 pages.

(56) References Cited

OTHER PUBLICATIONS

Japanese Office Action for Japanese Application No. 2016-506794, dated Feb. 7, 2017 with translation, 10 pages.
Japanese Office Action for Japanese Application No. 2016-506795, dated Feb. 7, 2017 with translation, 6 pages.
Jenkins, "Practical Requirements for a Domestic Vacuum-Cleaning Robot", From: AAAI Technical Report FS-93-03., JRL Consulting, Menlo Park, California, pp. 85-90.
Jones et al., Mobile Robots Inspiration to implementation, Second Edition, A.K. Peters, Ltd., 1999, Chapters 1 and 5, 72pages.
Jones et al., Mobile Robots Inspiration to Implementation, Second Edition, A.K. Peters Ltd., 1999, Chapters 6 and 9, 56pages.
Jones etal., Mobile Robots Inspiration to Implementation, Second Edition, A.K. Peters, Ltd., 1999, Chapters 10 and 11, 45pages.
Jung, et al. "Whisker Based Mobile Robot Navigation", Wollongong, NSW 2500, Australia, pp. 1-8.
Krishna, et al., "Solving the Local Minima Problem for a Mobile Robot by Classification of Spatio-Temporal Sensory Sequences". Journal of Robotic Systems 17 (10), 2000, pp. 549-564.
Kube, "A Minimal Infrared Obstacle Detection Scheme", Department of Computing Science, University of Alberta, Edmonton, Alberta, Canada, The Robotics Practitioner, 2(2): 15-20, 1996, Oct. 23, 1998, pp. 1-8.
Larson, "RoboKent—a case study in man-machine interfaces" Industrial Robot, vol. 25 No. 2, 1998, pp. 95-100.
LeBouthillier, "W. Grey Walter and his Turtle Robots", The Robot Builder, vol. Eleven No. Five, May 1999, RSSC POB 26044, Santa Ana,CA, pp. 1-8.
Maaref, et al."Sensor-based navigation of a mobile robot in an indoor environment", Robotics and Autonomous Systems, 2002, Elsevier, 18 pages.
Michael Carsten Bosse, "Atlas: A Framework for Large Scale Automated Mapping and Localization", Massachusetts Institute of Technology, Feb. 2004, Part 2, 67 pages.
Michael Carsten Bosse, "Atlas: A Framework for Large Scale Automated Mapping and Localization", Massachusetts Institute of Technology, Feb. 2004, Part 1, 140 pages.
Non Final Office Action for U.S. Appl. No. 14/409,291, dated Dec. 28, 2016, 61 pages.
Non Final Office Action for U.S. Appl. No. 15/101,515, dated Apr. 18, 2018, 14 pages.
Non Final Office Action for U.S. Appl. No. 15/101,235, dated Nov. 1, 2017, 11 pages.
Non Final Office Action for U.S. Appl. No. 15/535,506, dated May 1, 2019, 16 pages.
Non Final Office Action for U.S. Appl. No. 14/784,106, dated Oct. 19, 2017, 11 pages.
Non Final Office Action for U.S. Appl. No. 14/784,110, dated Aug. 16, 2018, 13 pages.
Non Final Office Action for U.S. Appl. No. 15/100,667, dated Nov. 29, 2017, 22 pages.
Non Final Office Action for U.S. Appl. No. 15/100,667, dated Sep. 12, 2016, 24 pages.
Non Final Office Action for U.S. Appl. No. 15/101,212, dated May 17, 2017, 8 pages.
Non Final Office Action for U.S. Appl. No. 15/101,235 dated Apr. 21, 2017, 10 pages.
Non Final Office Action for U.S. Appl. No. 15/101,235, dated Jun. 14, 2018, 11 pages.
Non Final Office Action for U.S. Appl. No. 15/101,257, dated Feb. 10. 2017, 10 pages.
Non Final Office Action for U.S. Appl. No. 15/101,510, dated Jul. 27, 2018, 17 pages.
Non Final Office Action for U.S. Appl. No. 15/102,107, dated Feb. 16, 2018, 12 pages.
Non Final Office Action for U.S. Appl. No. 15/102,015, dated Aug. 17, 2017, 13 pages.
Non Final Office Action for U.S. Appl. No. 15/102,017, dated Jan. 22, 2019, 15 pages.
Non Final Office Action for U.S. Appl. No. 15/321,333, dated Oct. 24, 2018, 10 pages.
Non Final Office Action for U.S. Appl. No. 15/504,066, dated Nov. 5, 2018, 18 pages.
Non Final Office Action for U.S. Appl. No. 15/504,071, dated Nov. 2, 2018, 17 pages.
Notice of Allowance for U.S. Appl. No. 14/409,291, dated Jun. 16, 2016, 13 pages.
Notice of Allowance for U.S. Appl. No. 14/409,291, dated Sep. 18, 2017, 8 pages.
Notice of Allowance for U.S. Appl. No. 14/784,106, dated Oct. 11, 2018, 7 pages.
Notice of Allowance for U.S. Appl. No. 15/100,667, dated Aug. 6, 2018, 22 pages.
Notice of Allowance for U.S. Appl. No. 15/101,212, dated Apr. 11, 2018, 9 pages.
Notice of Allowance for U.S. Appl. No. 15/101,257, dated Jul. 6, 2017, 9 pages.
Notice of Allowance for U.S. Appl. No. 15/101,515, dated Aug. 28, 2018, 11 pages.
Notice of Allowance for U.S. Appl. No. 15/102,015, dated Dec. 11, 2017, 8 pages.
Notice of Allowance for U.S. Appl. No. 15/102,295, dated Sep. 24, 2018, 9 pages.
Notice of Reasons for Rejection for Japanese Application No. 2016-526756, dated Aug. 10, 2017, with translation, 6 pages.
Notice of Reasons for Rejection for Japanese Application No. 2016-526759, dated Aug. 24, 2017 with translation, 9 pages.
Notice of Reasons for Rejection for Japanese Application No. 2016-526765, dated Aug. 25, 2017 with translation, 7 pages.
Notice of Reasons for Rejection of Japanese Application No. 2016-526764, dated Aug. 25, 2017 with translation. 6 pages.
Notification for Reasons for Refusal for Japanese Application No. 2016-526875, dated Oct. 31, 2017 with translation, 10 pages,.
Notification of Reasons for Refusal for Japanese Application No. 2016-526765, dated May 15, 2018 with translation, 6 pages.
Notification of Reasons for Refusal for Japanese Application No. 2016-526945, dated Oct. 31, 2017 with translation, 8 pages.
Notification of Reasons for Refusal for Japanese Application No. 2016-568949, dated Oct. 9, 2018 with translation, 6 pages.
Notification of Reasons for Refusal for Japanese Application No. 2017-501374, dated Mar. 6, 2016 with translation, 8 pages.
Notification of Reasons for Refusal for Japanese Application No. 2017-544589, dated Apr. 2, 2019 with translation, 6 pages.
Notification of Reasons for Refusal of Japanese Application No. 2016-568949, dated Oct. 1, 2018 with translation.
Notification of Reasons for Rejection for Japanese Application No. 2016-526947, dated Sep. 21, 2017 with translation, 8 pages.
Oren, Reply to Office Action dated Jun. 23, 2014, U.S. Appl. No. 13/757,985, pp. 1-10.
Pack, et al., "Constructing a Wall-Follower Robot for a Senior Design Project", 1996 ASEE Annual Conference Proceedings, Session 1532, pp. 1-7.
Position_Definition of Position by Merriam-Webster.pdf (Position Definition of Position by Merriam-Webster, Oct. 16, 2016, Merriam-Webster, https://www.merriam-webster.com/dictinary/position, pp. 1-15).
Report of Reconsideration for Japanese Application No. 2016-526875, dated Oct. 24, 2018, 2 pages.
Saffiotti, "Fuzzy logic in Autonomous Robot Navigation", a case study, Nov. 1995 Revised: Aug. 1997, IRIDIA, Universite Libre de Bruxelles, Belgium, , Technical Report TR/IRIDIA/ 95 25, Cover page + pp. 1-14.
Written Opinion for International Application No. PCT/EP2013/067500 dated Dec. 10, 2013, 7 pages.
Yamamoto, "SOZZY: A Hormone-Driven Autonomous Vacuum Cleaner", From: AAAI Technical Report FS-93-03, Matasushita Research Institute, Tokyo, and MIT Artificial Intelligence laboratory, Massachusetts, pp. 116-124 + Figure 9 and Figure 11.

(56) References Cited

OTHER PUBLICATIONS

Yoshida et ai., "Online Motion Planning Using Path Deformation and Replanning", 28th Annual Robot Society, with partial translation, 2011, vol. 29, No. 8, Chapter 3, pp. 716-725.

* cited by examiner

SYSTEM OF ROBOTIC CLEANING DEVICES

CROSS REFERENCE TO RELATED APPLICATION

This application is a Divisional Application of U.S. patent application Ser. No. 15/755,890, filed Feb. 27, 2018, which claims benefit of priority to U.S. National Phase application of PCT International Application No. PCT/EP2015/070140, filed Sep. 3, 2015, which are incorporated by reference herein.

TECHNICAL FIELD

The invention relates to a system of robotic cleaning devices and a method of a master robotic cleaning device of controlling at least one slave robotic cleaning device.

BACKGROUND

In many fields of technology, it is desirable to use robots with an autonomous behaviour such that they freely can move around a space without colliding with possible obstacles.

Robotic vacuum cleaners are known in the art, which are equipped with drive means in the form of a motor for moving the cleaner across a surface to be cleaned. The robotic vacuum cleaners are further equipped with intelligence in the form of microprocessor(s) and navigation means for enabling an autonomous behaviour such that the robotic vacuum cleaners freely can move around and clean a space in the form of e.g. a room. Thus, these prior art robotic vacuum cleaners have the capability of more or less autonomously vacuum cleaning a room in which furniture such as tables and chairs and other obstacles such as walls and stairs are located.

In various environments where a surface is to be cleaned by a robotic cleaning device, situations may arise where the robotic cleaning device cannot reach for instance into a corner or under a sofa, and the user will manually have to remove the debris or dirt which is out of reach for the robot, or use another cleaning device suitable for cleaning the particular surface.

SUMMARY

An object of the present invention is to solve, or at least mitigate, this problem in the art and to provide a system of robotic cleaning devices.

This object is attained in a first aspect of the invention by a system of robotic cleaning devices. The system comprises a master robotic cleaning device and at least one slave robotic cleaning device. The master robotic cleaning device comprises a propulsion system arranged to move the master robotic cleaning device, a cleaning member arranged to remove debris from a surface to be cleaned, an obstacle detection device arranged to detect obstacles, a controller arranged to position the robotic cleaning device with respect to the detected obstacles from positional data derived from the obstacle detection device, and further to control the propulsion system to move the master robotic cleaning device based on the positional data, and a wireless communication interface via which the master robotic cleaning device is arranged to submit commands the at least one slave robotic cleaning device to control a cleaning operation of the at least one slave robotic cleaning device, the commands being based on the derived positional data. The at least one slave robotic cleaning device comprises a propulsion system arranged to move the slave robotic cleaning device, a cleaning member arranged to remove debris from a surface to be cleaned, a wireless communication interface via which the slave robotic cleaning device is arranged to receive to commands submitted by the master robotic cleaning device, and a controller arranged to control the cleaning operation of the slave robotic cleaning device as indicated by the received commands.

This object is attained in a second aspect of the invention by a method performed by a master robotic cleaning device of controlling at least one slave robotic cleaning device. The method comprising detecting obstacles, deriving positional data from the detection of obstacles, positioning the master robotic cleaning device with respect to the detected obstacles from the derived positional data, controlling movement of the master robotic cleaning device based on the positional data, and submitting commands to the at least one slave robotic cleaning device to control a cleaning operation of said at least one slave robotic cleaning device, the commands being based on the derived positional data, wherein the cleaning operation of the slave robotic cleaning device is controlled as indicated by the submitted commands.

A system of robotic cleaning devices is provided comprising a master robotic cleaning device and at least on slave robotic cleaning device, where the master robotic cleaning device is capable of wirelessly controlling a cleaning operation of the slave robotic cleaning device.

A surface to be cleaned may for instance accommodate objects such as sofas, armchairs, bureaus, etc., under which the master robot cannot pass for performing a cleaning operation. Without a system according to the invention, the user would have to use for instance a broom or an ordinary vacuum cleaner to clean a surface below these objects.

Advantageously, the master robot instructs the slave robot, by submitting wireless control signals via its communication interface to a corresponding communication interface of the slave robot, to clean the surfaces that the master robot cannot reach based on the positional data derived by the master robot.

Further advantageous is that the slave robot is not required to be equipped with the same sophisticated obstacle detecting device as the master robot. Consequently, since the slave robot is instructed by the master robot how to navigate over the surface to be cleaned, based on positional data derived by the master robot, a less powerful slave robot controller can be used. Hence, the slave robot can advantageously be made much less complex than the master robot, with a correspondingly great reduction in cost.

In an embodiment, the master robotic device advantageously communicates to the slave robotic device a command indicating a surface over which the at least one slave robotic cleaning device is instructed to move and clean, for instance a surface located under a sofa having a clearance height less than the height of the master robot. The command may e.g. indicate the coordinates delimiting the surface. Alternatively, the command may include control data for the slave robot propulsion system in order to guide the slave robotic device over the surface to be cleaned. Upon receiving the command from the master robot, the slave robot moves to, and cleans, the surface.

In yet an embodiment, the slave robotic cleaning device is arranged to remove debris from a surface to be cleaned and gather the debris for subsequent pick-up by the master robotic cleaning device. Advantageously, there is no need to equip the slave robot with e.g. a dust container or suction fan, thereby facilitating an even less complex—and less noisy—slave robot. Further advantageous is that the slave robot becomes more or less maintenance-free, as there is no need to empty a dust container.

In still a further embodiment, the commands submitted by the master robotic cleaning device comprises data indicating a time of day or night at which the slave robotic cleaning device is instructed to perform the cleaning operation. For instance, the slave robot may advantageously be instructed to work a particular surface during night time, when no obstacles in the form of humans and animals will impede the slave robot. This is particularly advantageous in case the slave robot is not equipped with components such as a suction fan and/or a rotatable brush, in which the case the slave robot is relatively silent. In the morning, when the slave robot has gathered debris, the master robot will vacuum clean the debris from the place where the slave robot did gather the debris.

In another embodiment, the commands submitted from the master robotic cleaning device to the slave robotic cleaning device comprises an instruction to the slave robotic cleaning device to return to its charger after the cleaning operation has been performed.

In a further embodiment, the communication between the master robotic cleaning device and the slave robotic cleaning device is not performed via line-of sight-communication, but advantageously via a network such as a Wireless Local Area Network (WLAN). Thus, the master robot and the slave robot connect to the WLAN via a so called Access Point (AP) such as e.g. a home router for wireless WiFi communication. Advantageously, by communicating via a WLAN, the master robot and the slave robot can be located on a great distance from each other, such as on different floors in a building but still being capable of communicating with each other.

In still another embodiment, the master robot is advantageously arranged to communicate wirelessly, for example via Bluetooth or WLAN, with a mobile terminal (such as a smart phone, a tablet, a laptop, etc.) of a user wishing to control the cleaning operation of the slave robot 30. The user may communicate with the master robot via a particular app downloaded to the mobile terminal. Hence, the user may advantageously instruct the master robot regarding a desired cleaning operation to be performed by the slave robot, whereupon the master robot sends commands accordingly to the slave robot via its communication interface.

In yet a further embodiment, in order to facilitate the detection of the slave robot for the master robot, the slave robot is advantageously equipped with one or more light sources, such as light emitting diodes (LEDs), and/or luminous reflectors detectable by the master robot.

In still another embodiment, in order to facilitate the detection of the slave robot for the master robot, the slave robot is advantageously equipped with an optical detector configured to detect light emitted by the master robot onto the slave robot. Upon detecting the laser light emitted by the master robot, the slave robot communicates via its communication interface to the master robot that the light is detected.

In a further embodiment, by having the slave robot detected light emitted by the master robot, and instantly communicate that the light that has been detected at the optical detector, an operational clock of the master and the slave, respectively, can be synchronized to each other. Advantageously, any clock drift may be eliminated, which facilitates system navigation.

It is noted that the master robotic cleaning device and the slave robotic cleaning device may perform different types of cleaning operations. For instance, the master robot may be a vacuum cleaner while the slave robot is a floor washer.

The invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

The invention relates to robotic cleaning devices, or in other words, to automatic, self-propelled machines for cleaning a surface, e.g. a robotic vacuum cleaner, a robotic sweeper or a robotic floor washer. The robotic cleaning device according to the invention can be mains-operated and have a cord, be battery-operated or use any other kind of suitable energy source, for example solar energy.

Figure 1:
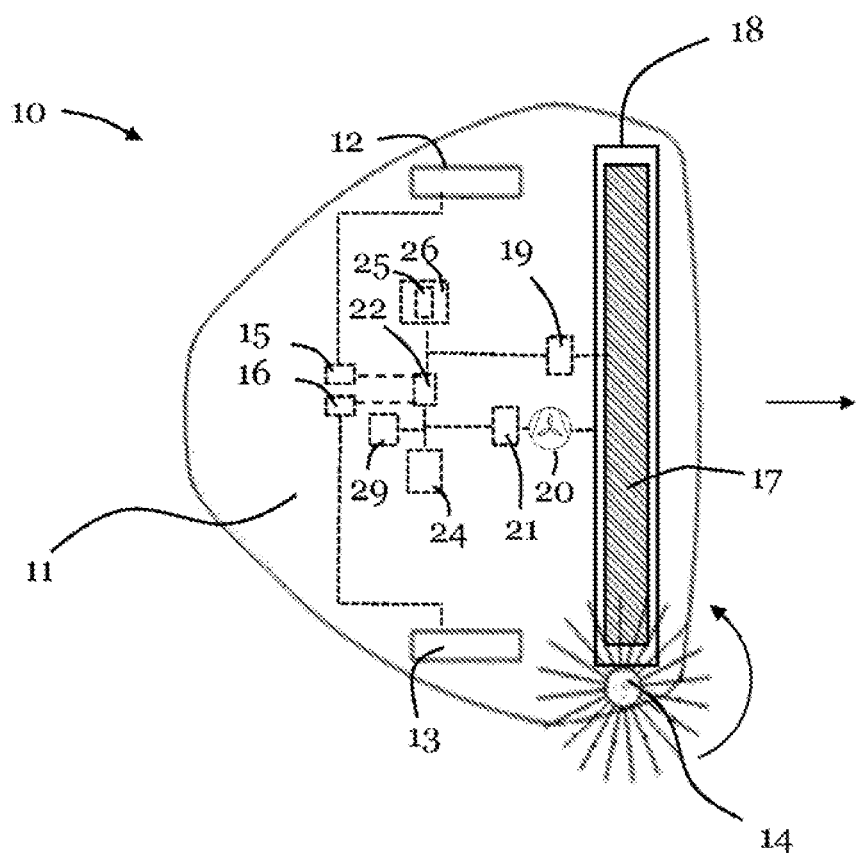
FIG. 1 shows a bottom view of a master robotic cleaning device according to an embodiment of the invention.

FIG. 1 shows a robotic cleaning device 10 according to embodiments of the present invention from below, i.e. the bottom side of the robotic cleaning device is shown. The arrow indicates the forward direction of the robotic cleaning device. The robotic cleaning device 10 comprises a main body 11 housing components such as a propulsion system comprising driving means in the form of two electric wheel motors 15, 16 for enabling movement of the driving wheels 12, 13 such that the cleaning device can be moved over a surface to be cleaned. Each wheel motor 15, 16 is capable of controlling the respective driving wheel 12, 13 to rotate independently of each other in order to move the robotic cleaning device 10 across the surface to be cleaned. A number of different driving wheel arrangements, as well as various wheel motor arrangements, can be envisaged. It should be noted that the robotic cleaning device may have any appropriate shape, such as a device having a more traditional circular-shaped main body, or a triangular-shaped main body. As an alternative, a track propulsion system may be used or even a hovercraft propulsion system. The propulsion system may further be arranged to cause the robotic cleaning device 10 to perform any one or more of a yaw, pitch, translation or roll movement.

A controller 22 such as a microprocessor controls the wheel motors 15, 16 to rotate the driving wheels 12, 13 as required in view of information received from an obstacle detecting device (not shown in FIG. 1) for detecting obstacles in the form of walls, floor lamps, table legs, around which the robotic cleaning device must navigate. The obstacles detected may also be embodied in the form of landmarks, barcodes, signposts, etc. The obstacle detecting device may be embodied in the form of a 3D sensor system registering its surroundings, implemented by means of e.g. a 3D camera, a camera in combination with lasers, a laser scanner, etc. for detecting obstacles and communicating information about any detected obstacle to the microprocessor 22. The microprocessor 22 communicates with the wheel motors 15, 16 to control movement of the wheels 12, 13 in accordance with information provided by the obstacle detecting device such that the robotic cleaning device 10 can move as desired across the surface to be cleaned. This will be described in more detail with reference to subsequent drawings.

Further, the main body 11 may optionally be arranged with a cleaning member 17 for removing debris and dust from the surface to be cleaned in the form of a rotatable brush roll arranged in an opening 18 at the bottom of the robotic cleaner 10. Thus, the rotatable brush roll 17 is arranged along a horizontal axis in the opening 18 to enhance the dust and debris collecting properties of the cleaning device 10. In order to rotate the brush roll 17, a brush roll motor 19 is operatively coupled to the brush roll to control its rotation in line with instructions received from the controller 22.

Moreover, the main body 11 of the robotic cleaner 10 comprises a suction fan 20 creating an air flow for transporting debris to a dust bag or cyclone arrangement (not shown) housed in the main body via the opening 18 in the bottom side of the main body 11. The suction fan 20 is driven by a fan motor 21 communicatively connected to the controller 22 from which the fan motor 21 receives instructions for controlling the suction fan 20. It should be noted that a robotic cleaning device having either one of the rotatable brush roll 17 and the suction fan 20 for transporting debris to the dust bag can be envisaged. A combination of the two will however enhance the debris-removing capabilities of the robotic cleaning device 10.

The robotic cleaning device 10 may further be equipped with an inertia measurement unit (IMU) 24, such as e.g. a gyroscope and/or an accelerometer and/or a magnetometer or any other appropriate device for measuring displacement of the robotic cleaning device 10 with respect to a reference position, in the form of e.g. orientation, rotational velocity, gravitational forces, etc. A three-axis gyroscope is capable of measuring rotational velocity in a roll, pitch and yaw movement of the robotic cleaning device 10. A three-axis accelerometer is capable of measuring acceleration in all directions, which is mainly used to determine whether the robotic cleaning device is bumped or lifted or if it is stuck (i.e. not moving even though the wheels are turning). The robotic cleaning device 10 further comprises encoders (not shown in FIG. 1) on each drive wheel 12, 13 which generate pulses when the wheels turn. The encoders may for instance be magnetic or optical. By counting the pulses at the controller 22, the speed of each wheel 12, 13 can be determined. By combining wheel speed readings with gyroscope information, the controller 22 can perform so called dead reckoning to determine position and heading of the cleaning device 10. The controller 22 may employ e.g. the commonly used robotic localization method Simultaneous Localization and Mapping (SLAM) to position the robotic cleaning device 10 with respect to its surroundings.

The main body 11 may further be arranged with a rotating side brush 14 adjacent to the opening 18, the rotation of which could be controlled by the drive motors 15, 16, the brush roll motor 19, or alternatively a separate side brush motor (not shown). Advantageously, the rotating side brush 14 sweeps debris and dust from the surface to be cleaned such that the debris ends up under the main body 11 at the opening 18 and thus can be transported to a dust chamber of the robotic cleaning device. Further advantageous is that the reach of the robotic cleaning device 10 will be improved, and e.g. corners and areas where a floor meets a wall are much more effectively cleaned. As is illustrated in FIG. 1, the rotating side brush 14 rotates in a direction such that it sweeps debris towards the opening 18 such that the suction fan 20 can transport the debris to a dust chamber. The robotic cleaning device 10 may comprise two rotating side brushes arranged laterally on each side of, and adjacent to, the opening 18.

The robotic cleaning device 10 further comprises a communication interface 29 comprising a wireless receiver and transmitter, typically embodied by a single unit known as a transceiver. The communication interface 29 communicates via e.g. infrared (IR), ultrasonic or radio-frequency (RF) signals with for instance a remote control utilizing line-of-sight communication or a server using wireless local area network (WLAN) technology.

The communication interface may further be connected to a user interface (not shown) provided on the robotic cleaning device 10 via which a user can provide the robotic cleaner 10 with a particular type of instruction, such as "start", "stop", "return to charging station", etc. The user interface may be of touch-screen type or mechanically configured comprising physical buttons to be operated. Further, the user interface may comprise display means for visually indicating a user selection. It should be noted that the user not necessarily need to provide input to the user interface by physically touching it, but may alternatively communicate with the robotic cleaner by means of the previously mentioned remote control.

With further reference to FIG. 1, the controller 22 embodied in the form of one or more microprocessors is arranged to execute a computer program 25 downloaded to a suitable storage medium 26 associated with the microprocessor, such as a Random Access Memory (RAM), a Flash memory or a hard disk drive. The controller 22 is arranged to carry out a method according to embodiments of the present invention when the appropriate computer program 25 comprising computer-executable instructions is downloaded to the storage medium 26 and executed by the controller 22. The storage medium 26 may also be a computer program product comprising the computer program 25. Alternatively, the computer program 25 may be transferred to the storage medium 26 by means of a suitable computer program product, such as a digital versatile disc (DVD), compact disc (CD) or a memory stick. As a further alternative, the computer program 25 may be downloaded to the storage medium 26 over a wired or wireless network. The controller 22 may alternatively be embodied in the form of a digital signal processor (DSP), an application specific integrated circuit (ASIC), a field-programmable gate array (FPGA), a complex programmable logic device (CPLD), etc.

Figure 2:
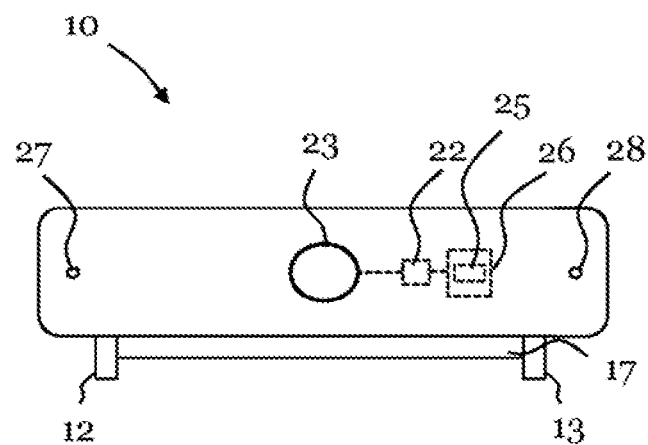
FIG. 2 shows a front view of the master robotic cleaning device of FIG. 1.

FIG. 2 shows a front view of the robotic cleaning device 10 of FIG. 1 in an embodiment of the present invention illustrating the previously mentioned obstacle detecting device in the form of a 3D sensor system comprising at least a camera 23 and a first and a second line laser 27, 28, which may be horizontally or vertically oriented line lasers. Further shown is the controller 22, the main body 11, the driving wheels 12, 13, and the rotatable brush roll 17 previously discussed with reference to FIG. 1a. The controller 22 is operatively coupled to the camera 23 for recording images of a vicinity of the robotic cleaning device 10. The first and second line lasers 27, 28 may preferably be vertical line lasers and are arranged lateral of the camera 23 and configured to illuminate a height and a width that is greater than the height and width of the robotic cleaning device 10. Further, the angle of the field of view of the camera 23 is preferably smaller than the space illuminated by the first and second line lasers 27, 28. The camera 23 is controlled by the controller 22 to capture and record a plurality of images per second. Data from the images is extracted by the controller 22 and the data is typically saved in the memory 26 along with the computer program 25.

The first and second line lasers 27, 28 are typically arranged on a respective side of the camera 23 along an axis being perpendicular to an optical axis of the camera. Further, the line lasers 27, 28 are directed such that their respective laser beams intersect within the field of view of the camera 23. Typically, the intersection coincides with the optical axis of the camera 23.

The first and second line laser 27, 28 are configured to scan, preferably in a vertical orientation, the vicinity of the robotic cleaning device 10, normally in the direction of movement of the robotic cleaning device 10. The first and second line lasers 27, 28 are configured to send out laser beams, which illuminate furniture, walls and other objects of e.g. a room to be cleaned. The camera 23 is controlled by the controller 22 to capture and record images from which the controller 22 creates a representation or layout of the surroundings that the robotic cleaning device 10 is operating in, by extracting features from the images and by measuring the distance covered by the robotic cleaning device 10, while the robotic cleaning device 10 is moving across the surface to be cleaned. Thus, the controller 22 derives positional data of the robotic cleaning device 10 with respect to the surface to be cleaned from the recorded images, generates a 3D representation of the surroundings from the derived positional data and controls the driving motors 15, 16 to move the robotic cleaning device across the surface to be cleaned in accordance with the generated 3D representation and navigation information supplied to the robotic cleaning device 10 such that the surface to be cleaned can be navigated by taking into account the generated 3D representation. Since the derived positional data will serve as a foundation for the navigation of the robotic cleaning device, it is important that the positioning is correct; the robotic device will otherwise navigate according to a "map" of its surroundings that is misleading.

The 3D representation generated from the images recorded by the 3D sensor system thus facilitates detection of obstacles in the form of walls, floor lamps, table legs, around which the robotic cleaning device must navigate as well as rugs, carpets, doorsteps, etc., that the robotic cleaning device 10 must traverse. The robotic cleaning device 10 is hence configured to learn about its environment or surroundings by operating/cleaning.

Hence, the 3D sensor system comprising the camera 23 and the first and second vertical line lasers 27, 28 is arranged to record images of a vicinity of the robotic cleaning from which objects/obstacles may be detected. The controller 22 is capable of positioning the robotic cleaning device 10 with respect to the detected obstacles and hence a surface to be cleaned by deriving positional data from the recorded images. From the positioning, the controller 22 controls movement of the robotic cleaning device 10 by means of controlling the wheels 12, 13 via the wheel drive motors 15, 16, across the surface to be cleaned.

The derived positional data facilitates control of the movement of the robotic cleaning device 10 such that cleaning device can be navigated to move very close to an object, and to move closely around the object to remove debris from the surface on which the object is located. Hence, the derived positional data is utilized to move flush against the object, being e.g. a thick rug or a wall. Typically, the controller 22 continuously generates and transfers control signals to the drive wheels 12, 13 via the drive motors 15, 16 such that the robotic cleaning device 10 is navigated close to the object.

Now, with reference to FIGS. 1 and 2, it can be deducted that the autonomously operating robotic cleaning device 10 is a highly sophisticated and complex device, requiring an advanced navigation system for moving over the surface to be cleaned. As previously has been discussed, it may be desirable to complement the robotic cleaning device 10, in the following being referred to as the "master" robotic cleaning device, with one or more less complex supporting or assisting robotic cleaning devices, in the following referred to as "slave" robotic cleaning devices.

Figure 3:
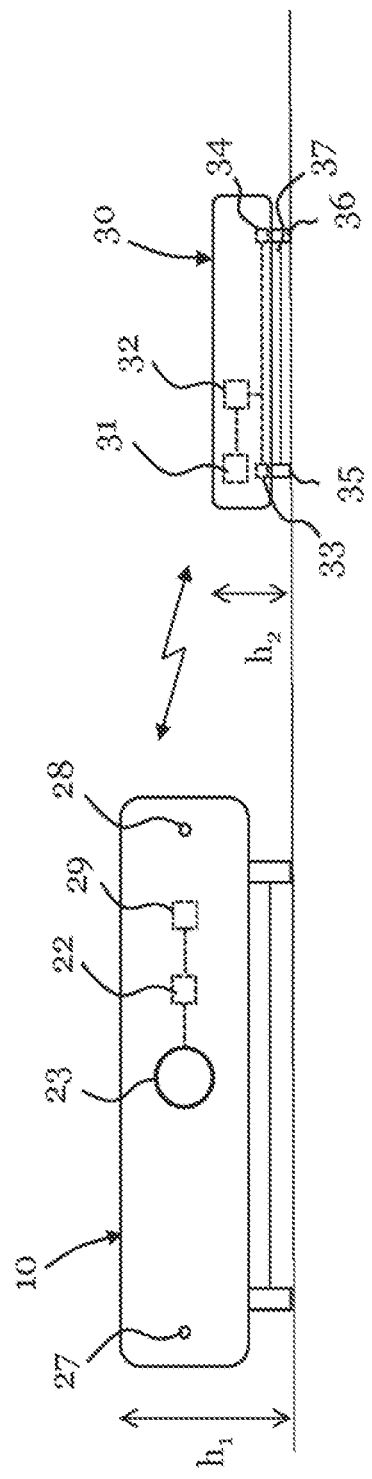
FIG. 3 shows a front view of a system of robotic cleaning devices according to an embodiment of the invention.

With reference to FIG. 3, in an embodiment of the invention, a system of robotic cleaning devices is thus provided comprising the master robotic cleaning device 10 as described with reference to FIGS. 1 and 2 and at least one slave robotic cleaning device 30, where the master robotic cleaning device is capable of wirelessly controlling a cleaning operation of the slave robotic cleaning device 30.

In FIG. 3, it is illustrated that the master robot 10 has a height $h_1$ while the slave robot 30 has a height $h_2$. Assuming for instance that the surface to be cleaned accommodates objects such as sofas, armchairs, bureaus, etc., having a clearance height h (i.e. distance from the floor up to an under side of the object) being less than $h_1$ but greater than $h_2$.

Thus, for objects having a clearance height less than $h_1$, the master robot cannot pass under for performing a cleaning operation. Without a system such as that shown in FIG. 3 illustrating an embodiment of the invention, the user will have to use for instance a broom or an ordinary vacuum cleaner to clean a surface below these objects.

Advantageously, in the embodiment illustrated with reference to FIG. 3, the master robot 10 instructs the slave robot 30, by submitting wireless control signals via the communication interface 29 to a corresponding communication interface 31 of the slave robot 30, to clean the surfaces under the objects having a clearance height less than $h_1$, as detected by the obstacle detecting device of the master robotic cleaning device 10. As previously has been discussed with reference to FIG. 2, the obstacle detection device (exemplified by the 3D sensor system comprising the camera 23 and the first and second line laser 27, 28 in FIG. 2) is arranged to detect obstacles surrounding the master robot 10, and the controller of the master robot 10 uses positional data derived from the obstacle detection device to position itself with respect to the surroundings, which also includes positioning the master robotic device 10 in relation to the slave robotic device 30 (being an "obstacle" in the surroundings of the master robot 10).

As in the case of the master robot 10, the slave robot 30 comprises a controller 30 configured to control a propulsion system comprising driving means in the form of e.g. two electric wheel motors 33, 34 for enabling movement of the driving wheels 35, 36 (or any other appropriate movement means) such that the slave cleaning device 30 can be moved over a surface to be cleaned, such as the surfaces under the furniture which the master robot 10 cannot reach. In this particular example, the slave robot 30 further comprises a cleaning member in the form of a rotatable brush roll 37 for more effectively removing debris from the surface to be cleaned.

With the system of cleaning robots according to embodiments of the present invention, the slave robot 30 is advantageously not required to be equipped with the same sophisticated obstacle detecting device (embodied in FIG. 3 by the 3D sensor system comprising the camera 23 and the two line lasers 27, 28) as the master robot 10. Consequently, since the slave robot 30 is instructed by the master robot 10 how to navigate over the surface to be cleaned (based on positional data derived by the controller 22 of the master robot 10 from the obstacle detection device as previously described), a less powerful controller 32 can be used. Hence, the slave robot 30 can advantageously be made much less complex than the master robot 10, with a correspondingly great reduction in cost.

Figure 4:
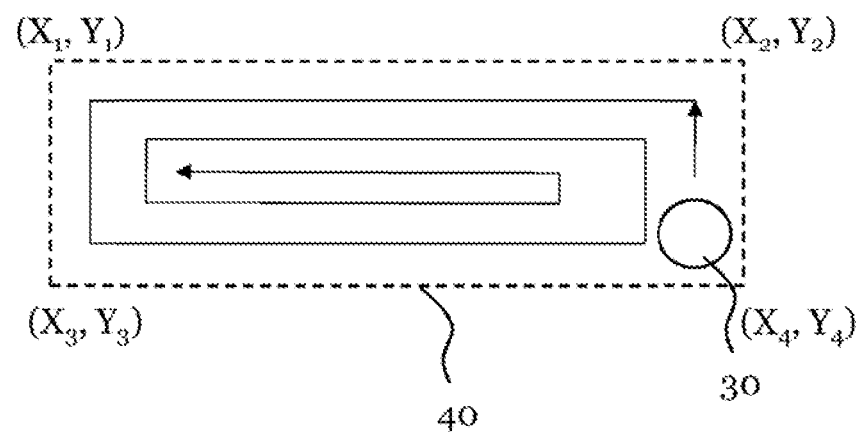
FIG. 4 shows a top view of a system of robotic cleaning devices according to an embodiment of the invention.
Figure 4:
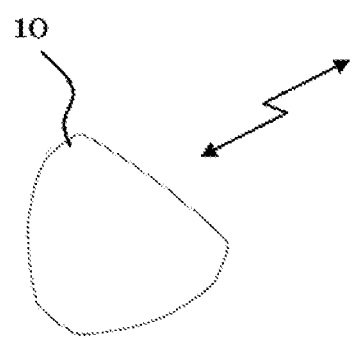

FIG. 4 illustrates, in a top view, the cleaning operation of the slave robotic device 30 as discussed with reference to the embodiment illustrated in FIG. 3. Hence, the master robotic device 10 communicates to the slave robotic device 30 a command indicating a surface 40 over which the at least one slave robotic cleaning device 30 is instructed to move and clean, for instance a surface located under a sofa having a clearance height less than $h_1$. The command may e.g. indicate the coordinates delimiting the surface 40; in FIG. 4 denoted $(X_1, Y_1)$, $(X_2, Y_2)$, $(X_3, Y_1)$. Alternatively, the command may include control data for the slave robot propulsion system in order to guide the slave robotic device 30 over the surface to be cleaned. Upon receiving the command from the master robot 10, the slave robot 30 moves to, and cleans, the surface 40. The slave robot 40 works the surface 40 in a pattern as indicated by the arrows, thus cleaning the surface 40. The slave robot is indicated in FIG. 4 to have a cylindrically shaped main body; this is exemplifying only, and the slave robot 30 may have any appropriate shape.

Figure 5A:
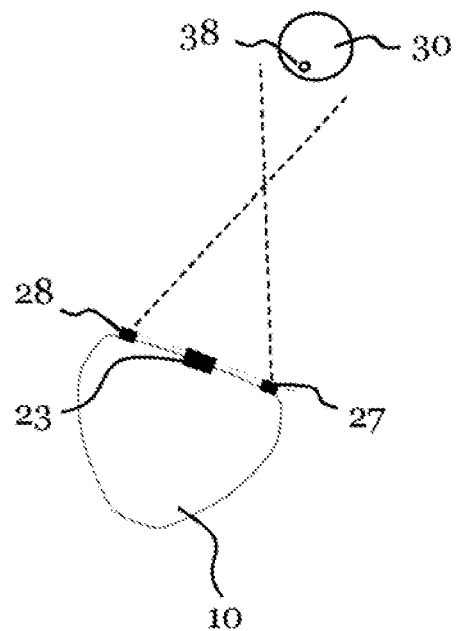
FIG. 5a illustrates detection of a slave robotic cleaning device according to an embodiment of the invention.

FIG. 5*a* illustrates an embodiment of the invention where the master robotic cleaning device 10 positions itself in relation to the slave robotic cleaning device 30. Now, in order to facilitate the detection of the slave robot 30 for the master robot 10, the slave robot is equipped with one or more light sources 38, such as light emitting diodes (LEDs), and/or luminous reflectors detectable by the master robot 10.

Thus, the master robot 10 emits light by means of its laser light sources 27, 28 onto the slave robot 30 and the camera 23 records images of a vicinity of the master robotic cleaning device 10 from which the slave robot 10 may be detected. Thereafter, the master robot 10 derives positional data of the detected objects from the recorded images, and positons itself in relation to the objects, including the slave robot 30.

Figure 5B:
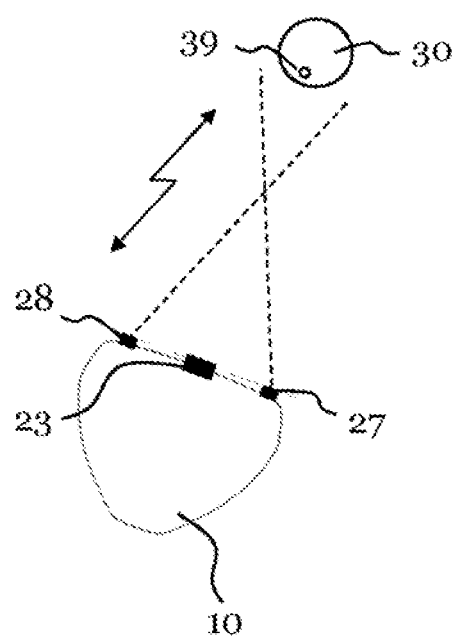
FIG. 5b illustrates detection of a slave robotic cleaning device according to another embodiment of the invention.

FIG. 5*b* illustrates a further embodiment of the invention where the master robotic cleaning device 10 positions itself in relation to the slave robotic cleaning device 30. Now, in order to facilitate the detection of the slave robot 30 for the master robot 10, the slave robot is in this embodiment equipped with an optical detector 39 configured to detect light emitted by the laser light sources 27, 28 of the master robot 10 onto the slave robot 30.

Upon detecting the laser light emitted by the master robot 10, the slave robot 30 communicates via its communication interface to the master robot 10 that the laser light is detected. As previously has been discussed, the interface may communicate via e.g. IR, ultrasonic or RF signals (possibly utilizing WLAN technology).

In this way, the master robot 10 is able of detecting—and positioning itself in relation to—the slave robot 30 using for instance SLAM.

Further advantageous is that, by having the slave robot 30 detected light emitted by the line lasers 27, 28 of the master robot 10, and instantly communicate that the light that has been detected at the optical detector 39, an operational clock of the master and the slave, respectively, can be synchronized to each other. Hence, any clock drift may be eliminated, which facilitates system navigation. It should be noted that the embodiments of the invention illustrated in FIGS. 5*a* and *b* can be combined; the slave robot 10 may thus comprise both LEDs 38 and an optical detector 39.

Figure 6:
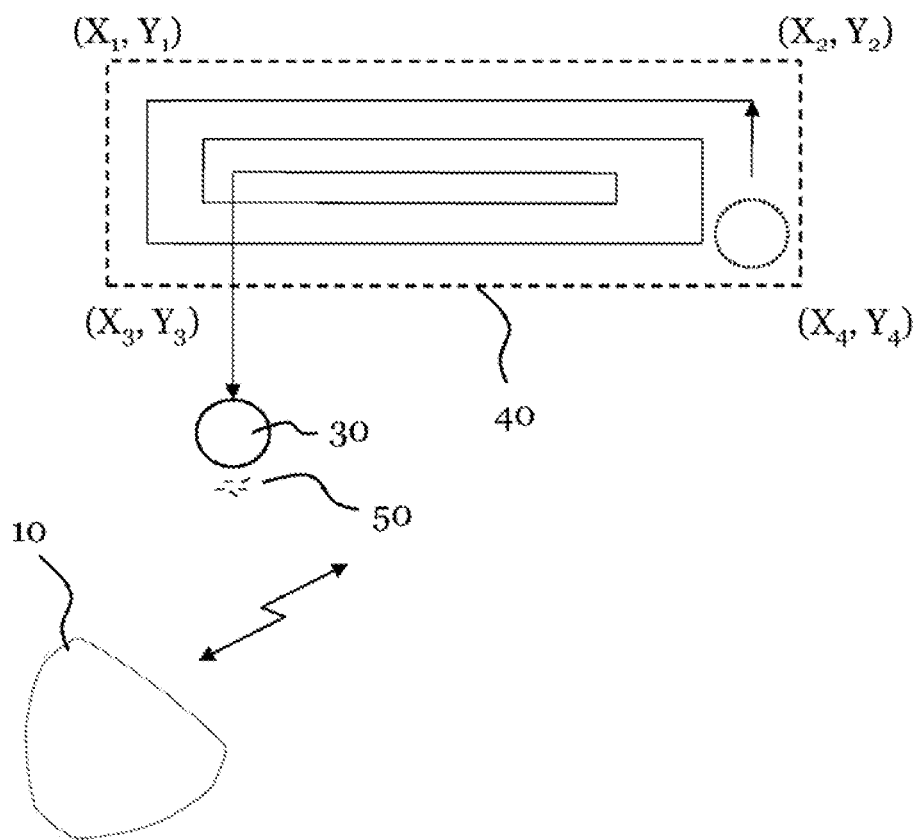
FIG. 6 shows a top view of a system of robotic cleaning devices according to another embodiment of the invention.

FIG. 6 illustrates, again in a top view, a further embodiment of the invention where, the master robotic device 10 communicates to the slave robotic device 30 a command indicating a surface 40 over which the at least one slave robotic cleaning device 30 is instructed to move. Again, the command may e.g. indicate the coordinates delimiting the surface 40; in FIG. 6 denoted $(X_1, Y_1)$, $(X_2, Y_2)$, $(X_3, Y_1)$. Upon receiving the command from the master robot 10, the slave robot 30 moves to the surface 40. However, in this particular embodiment, the slave robotic cleaning device 30 will itself not vacuum clean the surface 40. Instead, the slave robotic cleaning device 30 works the surface 40 in the pattern as indicated by the arrows by pushing the debris in from of it, for instance with the aid of a cleaning member in the form of a brush. The slave robot 30 will at the end of the cleaning operation leave any collected debris 50 outside of the surface 40 where the master robot 10 can reach and remove the debris 50.

This embodiment is advantageous since there is no need to equip the slave robot 30 with a dust container or suction fan, thereby facilitating an even less complex—and less noisy—slave robot 30. Further, with this embodiment, the slave robot is advantageously more or less maintenance-free, as there is no need to empty a dust container. A user will only occasionally have to remove debris that is stuck to the cleaning member of the slave robot 10.

Again with reference to FIG. 6, in yet another embodiment, the commands submitted by the master robotic cleaning device 10 comprises data indicating a time of day or night at which the slave robotic cleaning device 30 is instructed to perform the cleaning operation. For instance, the slave robot may advantageously be instructed to work a particular surface during night time, when no obstacles in the form of humans and animals will impede the slave robot 30. This is particularly advantageous in case the slave robot is not equipped with components such as a suction fan and/or a rotatable brush, in which the case the slave robot is relatively silent. In the morning, when the slave robot 30 has gathered debris, the master robot 10 will vacuum clean the debris from the place where the slave robot 30 did gather the debris.

Figure 7:
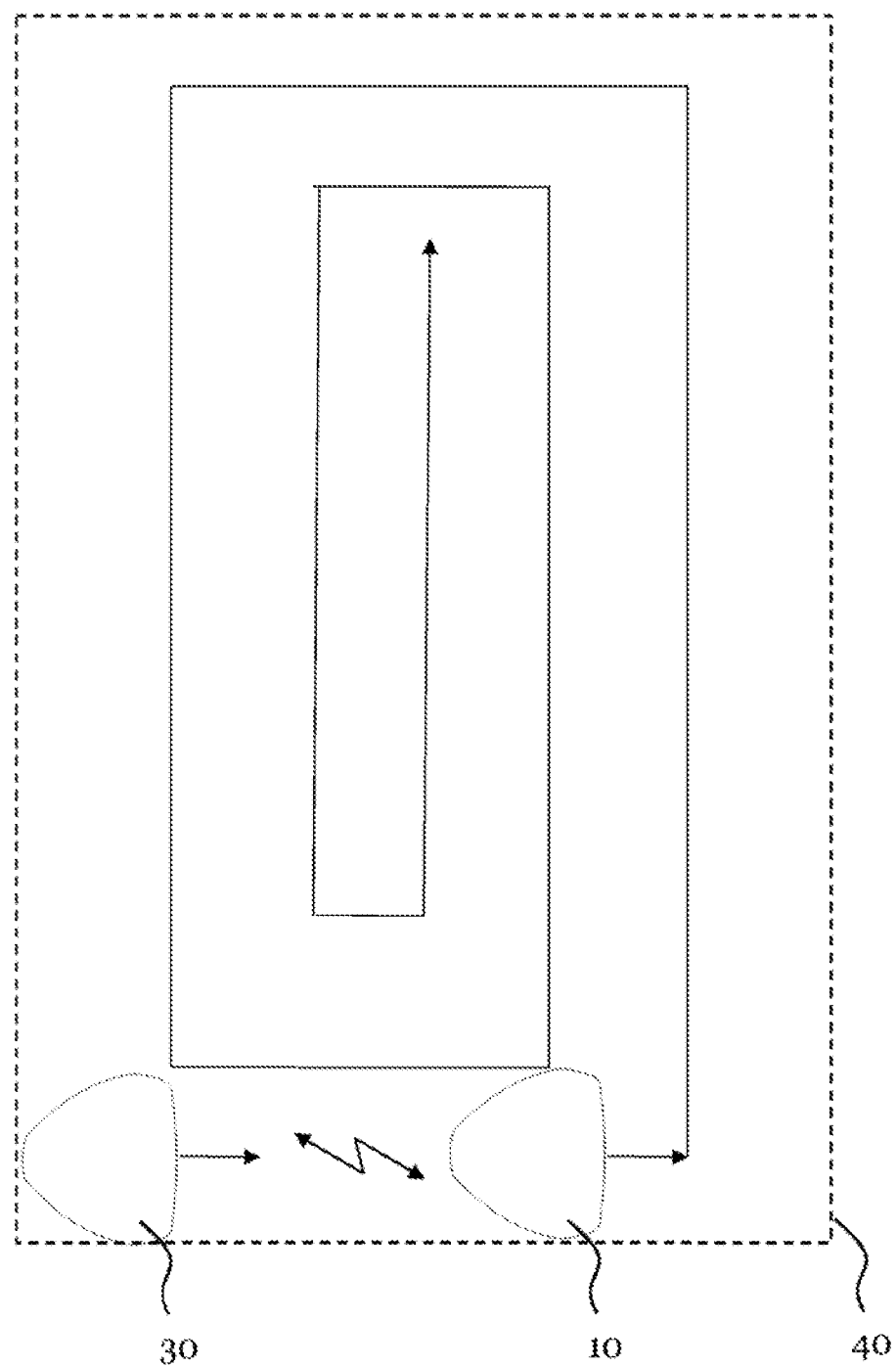
FIG. 7 shows a top view of a system of robotic cleaning devices according to yet another embodiment of the invention.

FIG. 7 illustrates yet a further embodiment of the present invention, where the master robotic cleaning device 10 and the slave robotic cleaning device 30 perform different types of cleaning operations. In this particular embodiment, the master robot 10 is a vacuum cleaner while the slave robot 30 is a floor washer. Thus, as the master robotic vacuum cleaner 10 sets out to vacuum clean the surface 40, it instructs the slave robotic floor sweeper 30 to perform its cleaning operation by sending commands indicating the position of the surface 40 to be cleaned as previously discussed. The slave robotic floor washer 30 can thus be operated to follow the master robotic vacuum cleaner 10 to advantageously perform the complementing cleaning operation of washing the floor as represented by the surface 40.

In the exemplifying embodiment of FIG. 7, the main body of the slave robotic floor washer 30 has the same shape as that of the master robotic vacuum cleaner 10. However, as previously discussed, in terms of intelligence, it can advantageously be made substantially less complex than the master robot 10. In case the slave robot 10 is embodied in the form of a robotic washer, its cleaning member typically comprises a swab component such as a mop.

In an embodiment of the invention, the commands submitted from the master robotic cleaning device 10 to the slave robotic cleaning device 30 comprises an instruction to the slave robotic cleaning device 30 to return to its charger (not shown) after the cleaning operation has been performed.

Figure 8:
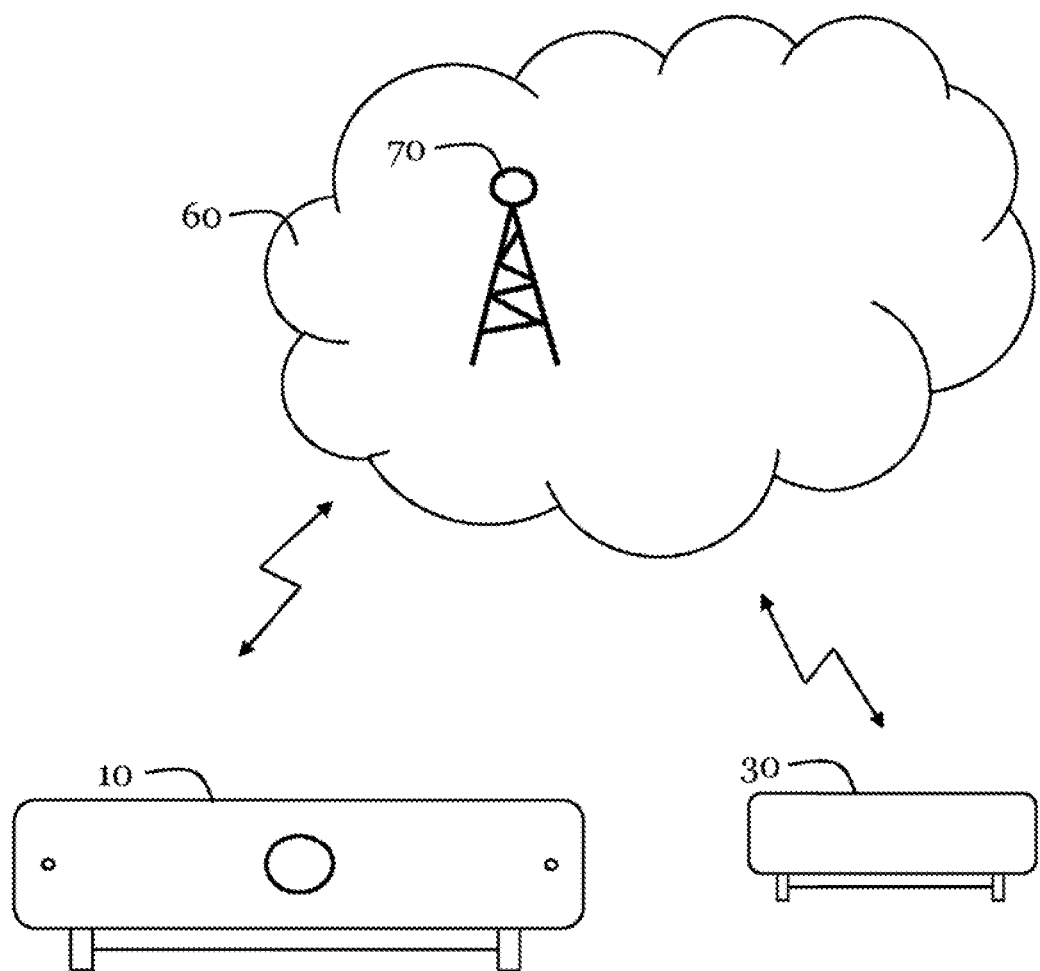
FIG. 8 illustrates a system of robotic cleaning devices communicating via a network according to an embodiment of the invention.

FIG. 8 shows yet a further embodiment of the invention, where the communication between the master robotic cleaning device 10 and the slave robotic cleaning device 30 is not performed via line-of sight-communication, but via a network such as a Wireless Local Area Network 60 (WLAN), commonly referred to as "WiFi". Thus, the master robot 10 and the slave robot 30 connects to the WLAN 60 via a so called Access Point (AP) 31 such as e.g. a home router for wireless WiFi communication, whereupon instructions can be submitted from the master robotic cleaning device 10 to the slave robotic cleaning device 30, in order for the slave robot to perform a desired cleaning operation.

Advantageously, by communicating via a WLAN, the master robot 10 and the slave robot 30 can be located on a great distance from each other, such as on different floors in a building but still being capable of communicating with each other.

Figure 9:
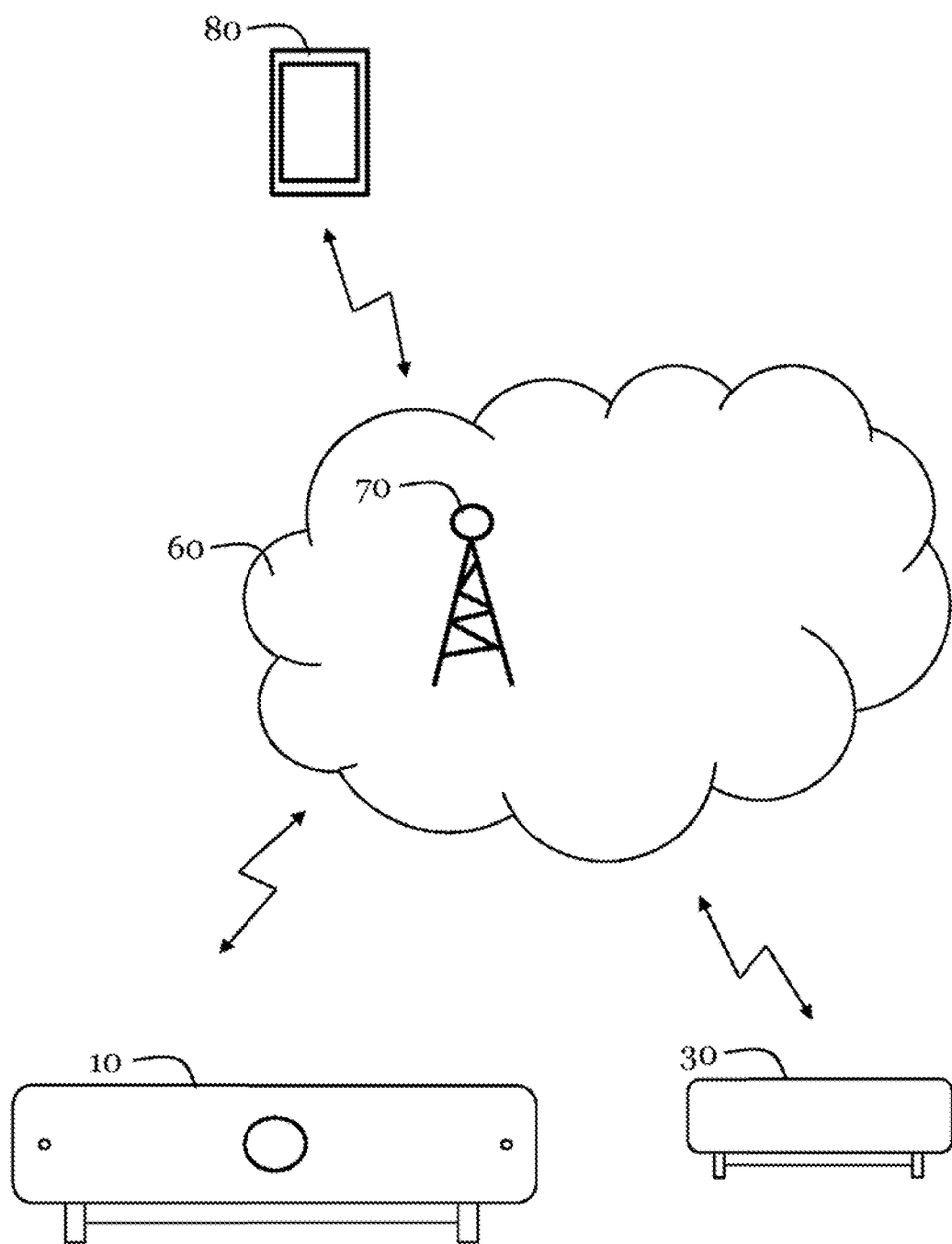
FIG. 9 illustrates a system of robotic cleaning devices according to an embodiment of the invention where the master robotic cleaning device communicates with a mobile terminal.

FIG. 9 illustrates still a further embodiment of the present invention, where the master robot 10 is arranged to communicate wirelessly, for example via Bluetooth or the WLAN 60, with a mobile terminal 80 (such as a smart phone, a tablet, a laptop, etc.) of a user wishing to control the cleaning operation of the slave robot 30. The user may communicate with the master robot 10 via a particular app downloaded to the mobile terminal 80. Hence, the user may advantageously instruct the master robot 10 regarding a desired cleaning operation to be performed by the slave robot 30, whereupon the master robot 10 sends commands accordingly to the slave robot 10 via its communication interface.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method performed by a master robotic cleaning device of controlling at least one slave robotic cleaning device, the method comprising:
    detecting obstacles;
    deriving positional data from the detection of obstacles;
    positioning the master robotic cleaning device with respect to the detected obstacles from the derived positional data;
    controlling movement of the master robotic cleaning device based on the positional data; and
    submitting commands to the at least one slave robotic cleaning device to control a cleaning operation of said at least one slave robotic cleaning device, the commands being based on the derived positional data, wherein the cleaning operation of the slave robotic cleaning device is controlled as indicated by the submitted commands;
    wherein the commands submitted by the master robotic cleaning device comprise an instruction to the at least one slave robotic cleaning device to remove debris from a surface to be cleaned and gather the debris for subsequent pick-up by the master robotic cleaning device.

2. The method of claim 1, wherein the commands submitted by the master robotic cleaning device comprise data indicating a surface over which the at least one slave robotic cleaning device is instructed to move.

3. The method of claim 1, wherein the commands submitted by the master robotic cleaning device comprise data indicating a time at which the at least one slave robotic cleaning device is instructed to perform the cleaning operation.

4. The method of claim 1, wherein the commands submitted by the master robotic cleaning device comprise an instruction to the at least one slave robotic cleaning device to return to its charger after the cleaning operation has been performed.

5. A computer product comprising a non-transitory computer readable medium, the non-transitory computer readable medium comprising a computer program comprising computer-executable instructions for causing a device to perform the steps recited in claim 1 when the computer-executable instructions are executed on a processing unit included in the device.

6. The method of claim 1, further comprising controlling the master robotic cleaning device to pick up the gathered debris.

7. The method of claim 1, wherein the master robotic cleaning device comprises a suction fan and suction fan motor configured to operate to push the gathered debris into the master robotic cleaning device.

8. The method of claim 7, wherein the slave robotic cleaning device comprises a brush configured to push the debris in front of the slave robotic cleaning device.

9. The method of claim 1, wherein the slave robotic cleaning device comprises a brush configured to push the debris in front of the slave robotic cleaning device.

10. The method of claim 1, wherein the slave robotic cleaning device does not have a dust container.

11. The method of claim 1, wherein the slave robotic cleaning device does not have a vacuum fan.

12. The method of claim 1, wherein the surface to be cleaned is under at least one of the detected obstacles.

13. The method of claim 1, wherein the master robotic cleaning device has a first height, and the slave robotic cleaning device has a second height, wherein the second height is less than the first height.

14. The method of claim 13, wherein the surface to be cleaned is under at least one of the detected obstacles and a bottom surface of the at least one of the detected obstacles has a height between the first height and the second height.

* * * * *